United States Patent
Fujihara et al.

(10) Patent No.: US 10,867,732 B2
(45) Date of Patent: Dec. 15, 2020

(54) SINTERED BODY FOR FORMING RARE-EARTH PERMANENT MAGNET AND ROTARY ELECTRIC MACHINE HAVING RARE-EARTH PERMANENT MAGNET

(71) Applicant: NITTO DENKO CORPORATION, Osaka (JP)

(72) Inventors: Makoto Fujihara, Osaka (JP); Kenichi Fujikawa, Osaka (JP); Shoichiro Saito, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 616 days.

(21) Appl. No.: 15/560,814

(22) PCT Filed: Mar. 24, 2016

(86) PCT No.: PCT/JP2016/059392
§ 371 (c)(1),
(2) Date: Sep. 22, 2017

(87) PCT Pub. No.: WO2016/152977
PCT Pub. Date: Sep. 29, 2016

(65) Prior Publication Data
US 2018/0114622 A1    Apr. 26, 2018

(30) Foreign Application Priority Data

Mar. 24, 2015 (JP) .................. 2015-061080
Jun. 18, 2015 (JP) .................. 2015-122734
Mar. 1, 2016 (JP) .................. 2016-039115

(51) Int. Cl.
*H01F 7/02* (2006.01)
*H02K 1/27* (2006.01)
(Continued)

(52) U.S. Cl.
CPC ......... *H01F 7/0247* (2013.01); *H01F 1/0577* (2013.01); *H01F 7/02* (2013.01);
(Continued)

(58) Field of Classification Search
CPC .......... H02K 1/22; H02K 1/27; H02K 1/2773; H02K 1/278; H01F 7/02; H01F 7/0247; H01F 1/0577; H01F 1/0247
(Continued)

(56) References Cited

U.S. PATENT DOCUMENTS 5,808,381 A    9/1998 Aoyama et al.
5,945,760 A    8/1999 Honda et al.
(Continued)

FOREIGN PATENT DOCUMENTS

CN    101123386 A    2/2008
CN    102064622 A    5/2011
(Continued)

OTHER PUBLICATIONS

English translation JP2010200459 (Year: 2010).*
(Continued)

*Primary Examiner* — Nguyen Tran
(74) *Attorney, Agent, or Firm* — Hauptman Ham, LLP

(57) ABSTRACT

This invention provides for a rotary electric machine that includes a rotor having a plurality of permanent magnets arranged in the circumferential direction, and in which the leakage of magnetic flux can be suppressed with a simple structure; and a rare-earth permanent magnet-forming sintered compact for forming rare-earth permanent magnets to be used in said rotary electric machine.

18 Claims, 11 Drawing Sheets

(51) Int. Cl.
  *H02K 15/03* (2006.01)
  *H02K 1/22* (2006.01)
  *H01F 1/057* (2006.01)
  *H01F 41/02* (2006.01)
  *H01F 1/08* (2006.01)
  *H01F 1/053* (2006.01)

(52) U.S. Cl.
  CPC ............... *H02K 1/22* (2013.01); *H02K 1/27* (2013.01); *H02K 15/03* (2013.01); *H01F 1/053* (2013.01); *H01F 1/08* (2013.01); *H01F 41/028* (2013.01); *H01F 41/0273* (2013.01)

(58) Field of Classification Search
  USPC .... 310/152, 154.28, 156.01, 156.02, 156.07, 310/156.25, 156.49, 156.55, 156.62, 310/156.64, 156.82
  See application file for complete search history.

(56) References Cited

U.S. PATENT DOCUMENTS

| | | | |
|---|---|---|---|
| 6,157,099 | A | 12/2000 | Hartman |
| 6,304,162 | B1 | 10/2001 | Nakatsuka et al. |
| 6,764,289 | B1 | 7/2004 | Hartman et al. |
| 8,269,392 | B2 | 9/2012 | Doi et al. |
| 9,281,107 | B2 | 3/2016 | Taihaku et al. |
| 9,991,033 | B2 | 6/2018 | Taihaku et al. |
| 9,991,034 | B2 | 6/2018 | Taihaku et al. |
| 2005/0076973 | A1 | 4/2005 | Masuzawa et al. |
| 2006/0113857 | A1 | 6/2006 | Honkura et al. |
| 2008/0231989 | A1 | 9/2008 | Oki et al. |
| 2009/0127960 | A1 | 5/2009 | Kawamura et al. |
| 2011/0080066 | A1 | 4/2011 | Doi et al. |
| 2012/0262019 | A1 | 10/2012 | Smith et al. |
| 2012/0262020 | A1 | 10/2012 | Smith et al. |
| 2013/0057102 | A1 | 3/2013 | Yamada et al. |
| 2013/0214631 | A1 | 8/2013 | Smith et al. |
| 2013/0285778 | A1 | 10/2013 | Taihaku et al. |
| 2013/0328453 | A1 | 12/2013 | Duncan et al. |
| 2014/0145808 | A1 | 5/2014 | Kume et al. |
| 2016/0141100 | A1 | 5/2016 | Taihaku et al. |
| 2016/0196903 | A1 | 7/2016 | Taihaku et al. |
| 2016/0247616 | A1 | 8/2016 | Smith et al. |
| 2019/0052137 | A1* | 2/2019 | Yabe .................. H02K 1/28 |

FOREIGN PATENT DOCUMENTS

| | | | |
|---|---|---|---|
| JP | S57-2801 A | | 1/1982 |
| JP | S61-69104 | | 4/1986 |
| JP | H2-308512 A | | 12/1990 |
| JP | H4-98804 A | | 3/1992 |
| JP | H8-107665 A | | 4/1996 |
| JP | H08-308156 | | 11/1996 |
| JP | H08-331783 | | 12/1996 |
| JP | H09-327139 | | 12/1997 |
| JP | 2000-102200 | | 4/2000 |
| JP | 2000-208322 | | 7/2000 |
| JP | 2001-6924 A | | 1/2001 |
| JP | 2004-031780 A | | 1/2004 |
| JP | 2005-44820 A | | 2/2005 |
| JP | 3864986 B2 | | 10/2006 |
| JP | 2008-199833 | | 8/2008 |
| JP | 2008-252968 | | 10/2008 |
| JP | 2009-142144 A | | 6/2009 |
| JP | 2009-254143 | | 10/2009 |
| JP | 2009-284740 A | | 12/2009 |
| JP | 2010-104136 A | | 5/2010 |
| JP | 2010-200459 | | 9/2010 |
| JP | 2011-109004 A | | 6/2011 |
| JP | 2012-165490 | | 8/2012 |
| JP | 2013-102641 | | 5/2013 |
| JP | 2013-191611 A | | 9/2013 |
| JP | 2015-032669 A | | 2/2015 |
| TW | 201301312 A1 | | 1/2013 |
| WO | 2012/176509 A1 | | 12/2012 |
| WO | 2013/175730 A1 | | 11/2013 |
| WO | 2015-015586 A1 | | 2/2015 |

OTHER PUBLICATIONS

English translation JP2009254143 (Year: 2009).*
Japanese Office Action dated Feb. 28, 2020 corresponding to Japanese Application No. 2018-101818, citing the Above reference.
Japanese Office Action dated Aug. 26, 2019 for corresponding Japanese Application No. 2017-508422, citing the above references with English Machine translation.
Taiwanese Office Action dated Dec. 26, 2018 for corresponding Taiwanese Application No. 105109040, citing the above references.
English Translation of the Written Opinion of the International Searching Authority dated Jun. 15, 2016, which issued during prosecution of International Application No. PCT/JP2016/059392.
Chinese Office Action dated Jan. 24, 2019 for corresponding Chinese Application No. 201680017806.9 with its English translation, citing the above reference.
Japanese Office Action dated Sep. 9, 2019 for corresponding Japanese Application No. 2017-508423 with English translation.
Japanese Office Action dated Sep. 17, 2019 for corresponding Japanese Application No. 2017-508424 with English translation.
Chinese Office Action dated Sep. 25, 2019 for corresponding Chinese Application No. 201680017806.9, citing the above references withe English Machine translation.
International Search Report dated Jun. 28, 2016, which issued during prosecution of International Application No. PCT/JP2016/059392.
Japanese Office Action dated Jun. 10, 2019 for corresponding Japanese Application No. 2017-508425, citing the above references.
The extended European search report for corresponding European application 16768880.3 dated Dec. 6, 2018, citing the above references.
Office Action issued in corresponding Japanese Patent Application No. 2017-508422 dated Jun. 1, 2020 along with a machine translation, citing above references, 6 pages.
Office Action issued in corresponding Japanese Patent Application No. 2017-508423 dated Jun. 1, 2020 along with a machine translation, 9 pages.
Office Action issued in corresponding Japanese Patent Application No. 2017-508424 dated Jun. 1, 2020 along with a machine translation, 4 pages.
Office Action issued for corresponding Japanese Patent Application No. 2018-101818 dated Oct. 1, 2020, along with an English machine translation.

* cited by examiner

FIG.4

| | comparative example 4 | comparative example 1 | calculation model 1 | calculation model 2 | comparative example 2 | comparative example 3 |
|---|---|---|---|---|---|---|
| end position shape | rectangular | rectangular | slanted | slanted | arcuate | arcuate |
| projection | no | yes | yes | yes | yes | yes |
| section | | | | | | |
| dimension (mm) | — | a=3 b=3 | a=4 b=2 | a=3.5 b=2.5 | a=2.395 r=6.68 | a=2.616 r=10.02 |
| orientation of magnetization axes | parallel | parallel | radial / parallel | arcuate / parallel | arcuate / parallel | arcuate / parallel |

θ=16.7°   θ=8.5°

FIG.5
(a)
mean torque
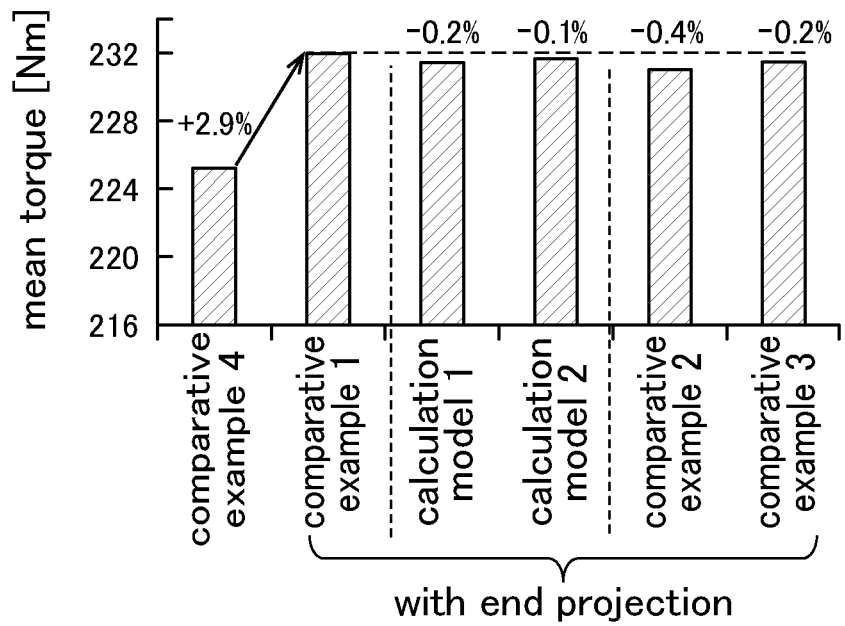
(b)
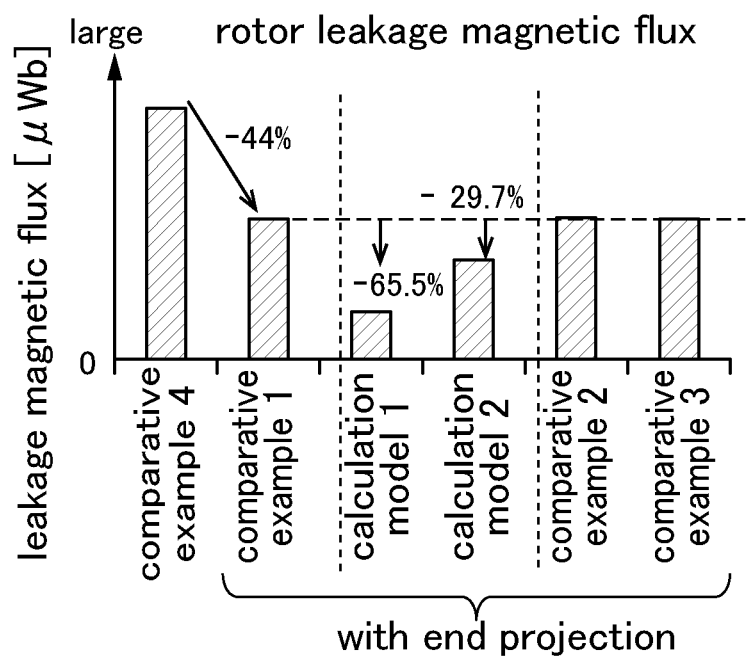

FIG.9
(a) 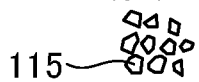
(b) 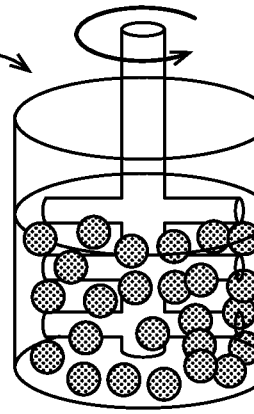
(c) 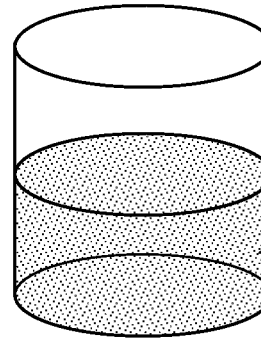
magnet material particles
binder
(d) 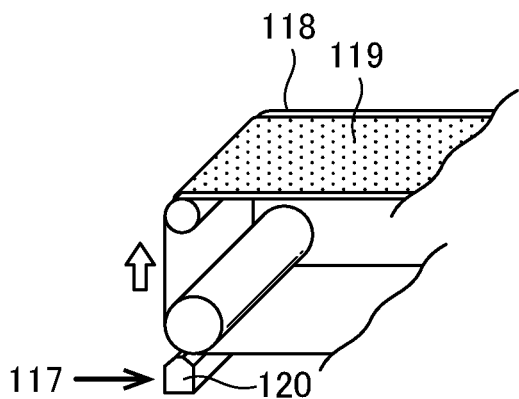

FIG.10
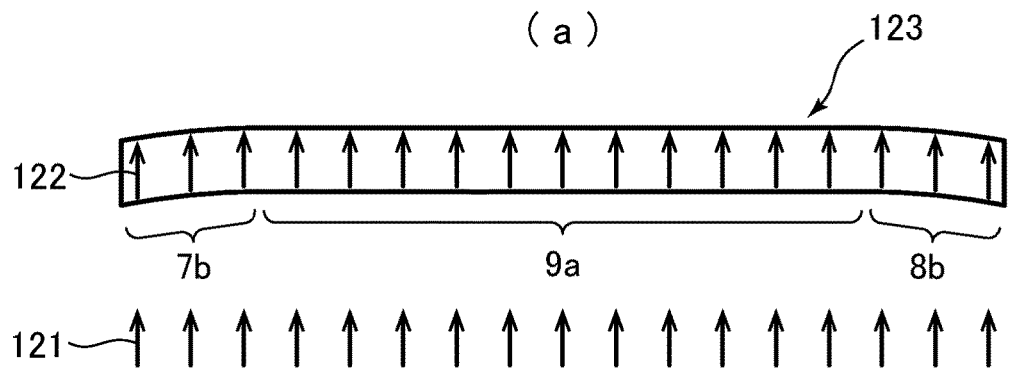
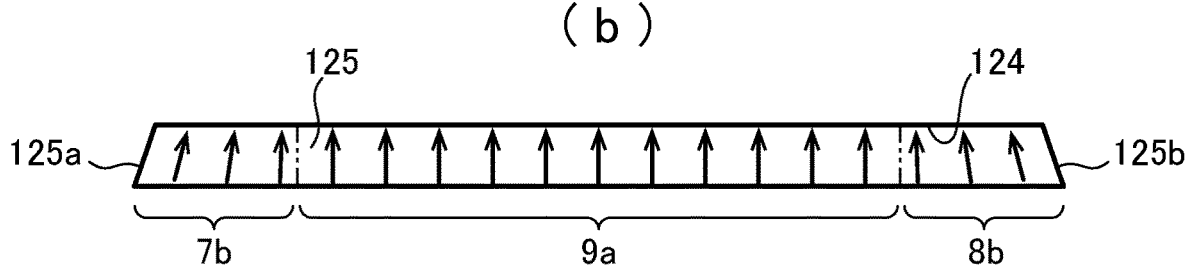
FIG.11
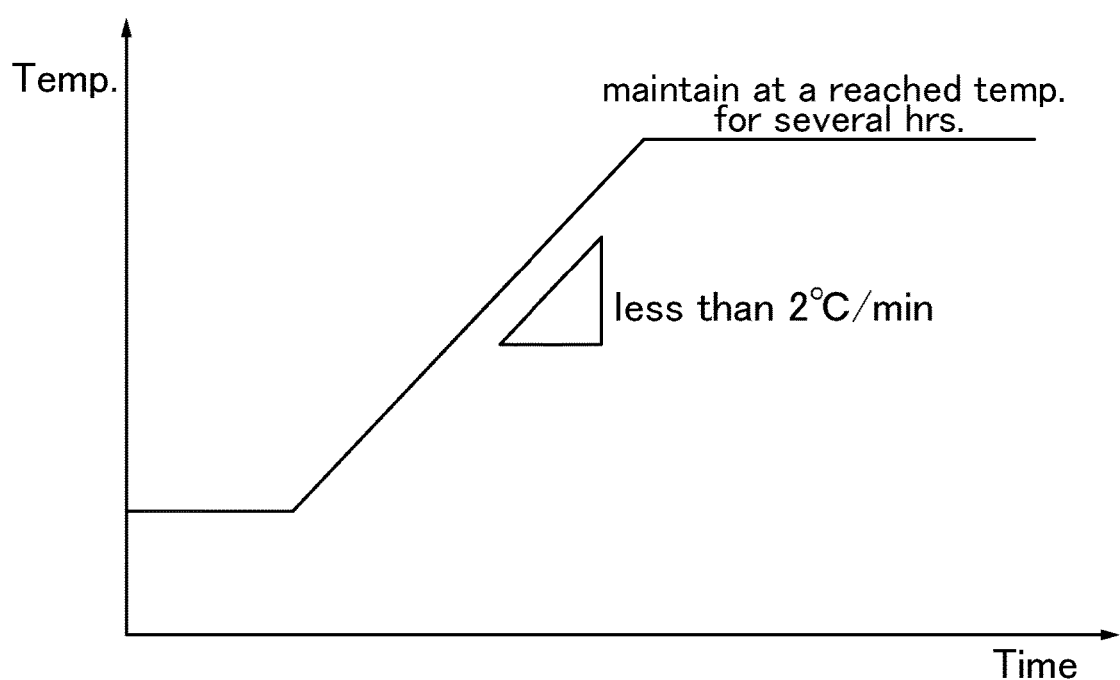

SINTERED BODY FOR FORMING RARE-EARTH PERMANENT MAGNET AND ROTARY ELECTRIC MACHINE HAVING RARE-EARTH PERMANENT MAGNET

RELATED APPLICATIONS AND INCORPORATION BY REFERENCE

The present patent application is filed pursuant to 35 U.S.C. § 371 as a U.S. National Phase Application of International Patent Application No. PCT/JP2016/059392 filed on Mar. 24, 2016, claiming the benefit of priority to Japanese Patent Application Nos. 2015-061080 filed on Mar. 24, 2015, 2016-039115 filed Mar. 1, 2016 and 2015-122734 filed Jun. 18, 2015. The International Application was published as WO 2016/152977 on Sep. 29, 2016. The contents of each of the aforementioned patent applications are herein incorporated by reference in their entirety.

TECHNICAL FIELD

The present invention relates to a rotary electric machine such as an electric motor or a generator having rare-earth permanent magnets. The present invention further relates to a sintered body for forming a rare-earth permanent magnet adapted to be used in such rotary electric machine. A rare-earth permanent magnet has a structure in which magnet material particles including rare-earth materials are integrally sintered and which can be used for forming a rare-earth permanent magnet by magnetizing the magnet material particles.

BACKGROUND ART

In an electric motor including an annular stator and a rotor carried by an axially extending rotating shaft and disposed in the annular stator with an air gap between the stator and the rotor, it has been known by for example JP H8-331783 (Patent Document 1) to provide permanent magnets embedded in a core of the rotor so that a reluctance torque can be advantageously utilized in addition to a magnet torque. Further, JP-H9-327139 (Patent Document 2) discloses a structure wherein the aforementioned type of electric motor is provided with a rotor including a plurality of radially outwardly projecting magnet poles at circumferentially equidistant positions and a permanent magnet positioned between each two adjacent magnet poles, so that the number of permanent magnets on the rotor can be decreased. In this type of motor, the rotor core is arranged to be opposed to the stator having a plurality of magnet poles with an air gap therebetween, and the rotor core is provided at a plurality of circumferentially spaced positions with permanent magnets. The Patent Documents 1 and 2 describe these machines as an electric motor, however, the machines of the same structure can be used as generators. Therefore, in this context, a term "rotary electric machine" is used for including both an electric motor and a generator.

It has been pointed out that this type of rotary electric machine has a problem of decreased efficiency caused by a magnetic flux leak from the stator or the rotor. In order for preventing such magnetic flux leakage, JP H8-308156 (Patent Document 3) proposes to provide a structure for blocking a magnetic path between a rotational shaft and a bearing for supporting the rotational shaft. Specifically, the Patent Document 3 discloses a rotary electric machine including a rotational shaft which is coaxially aligned with a rotor shaft fixed to a rotor and extending axially outwardly through a bearing, the first mentioned rotational shaft being connected to the rotor shaft through a non-magnetic sleeve. Further, J P 2012-165490 (Patent Document 4) teaches a structure for reducing the magnetic flux leakage from the rotor to the rotor shaft, wherein a rotor core is formed at a plurality of circumferentially spaced apart positions with slots with permanent magnets inserted into these slots, and a recess having a high magnetic resistance is formed between the rotor core and the rotor shaft JP 2013-102641 (Patent Document 5) teaches, in a rotary electric machine including a rotor provided at circumferentially equidistant positions with a plurality of magnetic poles and a permanent magnet disposed between each two adjacent magnetic poles, to provide a back side auxiliary magnet magnetized in radial direction at a radially inward position of each magnetic pole and an inter pole magnet magnetized in circumferential direction between each two adjacent magnetic poles, for reducing magnetic flux leakage. Further, J P 2000-102200 (Patent Document 6) discloses a structure having primary permanent magnets provided at equidistant positions on an outer peripheral surface of a rotor, and end permanent magnets provided at the axially opposite ends of each primary magnet, each of the end permanent magnets being projected radially outwardly than the primary magnet, so as to prevent the magnetic flux in the rotating magnetic field from being leaked in the direction of the rotor shaft.

JP 2000-208322 (Patent Document 7) teaches a manner for making magnet material particles orientated. According to the teachings by the Patent Document 7, the body of the magnet includes a first and second segments which are essentially adjacent to each other, each of the segments having N and S poles, and a first region having a first region axis being provided between the N and S poles and a second region encircling the first region. Magnet material particles for forming a magnet are aligned during manufacture in such a manner that the particles in the first region are oriented essentially in parallel with the first region axis and the particles in the second region are oriented with an angle with respect to the first region axis. In a specific arrangement, the magnet material particles are oriented in a direction angled with respect to an end surface at an end region.

The structure described in each of the Patent Documents 1 to 6 is directed to suppression of magnetic flux leakage, however, the measures for the purpose are complicated, so that there is a demand for a structure which is simpler in structure but can provide an effective result. Further, in the magnet in accordance with the teachings in the Patent Document 7, the orientation of the magnet material particles produces a magnetic pole at a corner portion, so that there will be no effect in respect of prevention the magnetic flux leakage but rather the magnetic flux leakage may be increased.

CITATION LIST

[Parent Document]
Patent Document 1: JP H8-331783 A
Patent Document 2: JP-H9-327139A
Patent Document 3: JP H8-308156A
Patent Document 4: JP 2012-165490A
Patent Document 5: JP 2013-102641A
Patent Document 6: JP 2000-102200A
Patent Document 7: JP 2000-208322A

SUMMARY OF INVENTION

Technical Problem

It is a primary object of the present invention to provide a rotary electric machine including a plurality of circumferentially arranged permanent magnets in which magnetic flux leakage can be suppressed with a simple structure, and a sintered body for forming a rare-earth permanent magnet adapted to be used for such a rotary electric machine.

Solution to Technical Problem

In order to accomplish the above object, in a first aspect, the present invention provides a rotary electric machine including rare-earth permanent magnets. The rotary electric machine comprises an annular stator and a rotor arranged on a rotational shaft arranged rotationally about a rotational axis in the stator to extend longitudinally through the stator with an air gap between the stator and the rotor, the rotor having at least one rare earth permanent magnet arranged with a lengthwise direction parallel with the rotational axis. The rare-earth magnet includes a first surface extending in said lengthwise direction, a second surface distant in a widthwise direction from the first surface and extending in the lengthwise direction, and end surfaces located in the opposite end portions as seen in the direction of the lengthwise direction, at least one of the end surfaces being projected beyond a corresponding end surface of the stator toward a lengthwise outward direction. The rare-earth permanent magnet is manufactured by sintering and forming magnet material particles containing rare-earth materials, into a shape having at least one of the end surfaces is formed into a first slanted surface which is slanted and extends from the lengthwise end portion of the first surface toward the lengthwise outward direction so that the magnet has a predetermined three dimensional shape having a length of the first surface shorter than the second surface.

The rare-earth permanent magnet includes divided regions at least including a lengthwise central region, and a first end region which extends from the aforementioned at least one end surface to a portion apart from the end surface for a predetermined lengthwise distance. In the central region, the magnet material particles in the central region are such that magnetization axes of the magnet material particles included in the central region are oriented in a manner of parallel orientation wherein the magnetization axes of the magnet material particles are oriented substantially perpendicularly to the first surface which extends in the lengthwise direction. The magnet material particles in the first end region are oriented in a portion adjacent to the at least one end surface are oriented toward the first surface in such a manner that the magnetization axes of the magnet material particles are oriented substantially along the slanted angle of the first slanted surface, but in a portion adjacent to the central region, the magnet material particles are oriented such that the magnetization axes of the magnet material particles are oriented substantially perpendicularly to the first surface, and in a portion between the at least one end surface and the central region, the magnetization axes of the magnet material particles are oriented such that the orientation angle of the easy magnetization axes of the magnet material particles are gradually changed from the end surface to the central region and converged toward the first surface.

In the aforementioned aspect of the present invention, the rare-earth permanent magnet may be of a structure wherein the other of the end surfaces is projected beyond a corresponding end surface of the stator toward a lengthwise outward direction. In such a case, the other end surface is formed into a second slanted surface which is slanted and extends from the lengthwise end portion of the first surface toward the lengthwise outward direction so that the magnet has a predetermined three dimensional shape having a length of the first surface shorter than the second surface. Further, the rare-earth permanent magnet may include a second end region which extends from the other of the end surfaces to a portion apart from the other end surface for a predetermined lengthwise distance, and the magnet material particles in the second end region are oriented in a portion adjacent to the other end surface are oriented toward the first surface in such a manner that the magnetization axes of the magnet material particles are oriented substantially along the slanted angle of the first slanted surface, but in a portion between the other end surface and the central region, the magnetization axes of the magnet material particles are oriented such that the orientation angle of the easy magnetization axes of the magnet material particles are gradually changed from the end surface to the central region and converged toward the first surface.

It is preferable in this aspect of the present invention that the slanted angle $\theta_1$ of the first slanted surface with respect to a line perpendicular to the first surface is in a range between 5° and 45°. It is further preferable that the slanted angle $\theta_2$ of the second slanted surface with respect to a line perpendicular to the first surface is in the range between 5° and 45°. Alternatively, the slanted angle $\theta_1$ of the first slanted surface with respect to a line perpendicular to the first surface may be in a range between 5° and 15°. Similarly, the slanted angle $\theta_2$ of the second slanted surface with respect to a line perpendicular to the first surface may be in the range between 5° and 15°.

Further, in the aforementioned aspect of the present invention, the first end region may be arranged such that it extends lengthwise outward direction beyond a corresponding lengthwise end surface of the rotor. Similarly, the second end region may be arranged such that it extends lengthwise outward direction beyond a corresponding lengthwise end surface of the stator. It is further to be noted in this aspect of the present invention it is preferable that the first end region be defined to satisfy a relation $0.1 \leq a/L \leq 0.6$, where 2L is a lengthwise dimension of the second surface and a is a lengthwise dimension of the first end region along the second surface. Further, it is preferable with respect to the second end region that the second end region is defined such that a relation $0.1 \leq a/L \leq 0.6$ is met, where a is a lengthwise dimension of the second end region.

In another aspect, the present invention provides a rare-earth permanent magnet-forming sintered body adapted to be assembled in a rotary electric machine. A rare-earth permanent magnet obtainable by magnetizing the sintered body includes a surface extending in a lengthwise direction and is assembled in rotary electric machine with the surface arranged in parallel with the rotational axis of the rotor of the rotary electric machine. The sintered body for forming a rare-earth permanent magnet according to this aspect of the present invention includes magnet material particles containing rare-earth materials, and is the one which has been sintered into a three dimensional body having a first surface extending in a lengthwise direction, a second surface distant in a widthwise direction from the first surface and extending in the lengthwise direction, and end surfaces located in the opposite end portions. Among the opposite longitudinal end surface, at least one of the end surfaces is formed into a first slanted surface which is slanted and extends from the lengthwise end portion of the first surface toward the lengthwise outward direction so that the magnet has a predetermined three dimensional shape having a length of the first surface shorter than the second surface. Further, the sintered body for forming a rare-earth permanent magnet includes divided regions at least including a lengthwise central region, and a first end region which extends from the aforementioned at least one end surface to a portion apart from the end surface for a predetermined lengthwise distance, and in the central region, the magnet material particles in the central region are such that easy magnetization axes of the magnet material particles included in the central region are oriented in a manner of parallel orientation wherein the easy magnetization axes of the magnet material particles are oriented substantially perpendicularly to the first surface which extends in the lengthwise direction. The magnet material particles in the first end region are oriented at least in a portion adjacent to the at least one end surface are oriented toward the first surface in such a manner that the easy magnetization axes of the magnet material particles are oriented substantially along the slanted angle of the first slanted surface, but in a portion adjacent to the central region, the magnet material particles are oriented such that the easy magnetization axes of the magnet material particles are oriented substantially perpendicularly to the first surface, and in a portion between the at least one end surface and the central region, the easy magnetization axes of the magnet material particles are oriented such that the orientation angle of the easy magnetization axes of the magnet material particles are gradually changed from the end surface to the central region and converged toward the first surface.

In this aspect of the present invention, the other end surface among the opposite lengthwise end surfaces is preferably formed into a second slanted surface which is slanted and extends from the lengthwise end portion of the first surface toward the lengthwise outward direction so that the sintered body has a predetermined three dimensional shape having a length of the first surface shorter than the second surface. Further, it is preferable that sintered body for forming a rare-earth permanent magnet may include a second end region which extends from the other of the end surfaces to a portion apart from the other end surface for a predetermined lengthwise distance, and the magnet material particles in the second end region are oriented in a portion adjacent to the other end surface are oriented toward the first surface in such a manner that the easy magnetization axes of the magnet material particles are oriented substantially along the slanted angle of the first slanted surface, but in a portion between the other end surface and the central region, the easy magnetization axes of the magnet material particles are oriented such that the orientation angle of the easy magnetization axes of the magnet material particles are gradually changed from the end surface to the central region and converged toward the first surface. In this case, the slanted angle $\theta_1$ of the first slanted surface with respect to the first surface is preferably in a range between 5° and 45°. It is further preferable that the slanted angle $\theta_2$ of the second slanted surface with respect to the first surface is in the range between 5° and 45°. The slanted angle $\theta_1$ of the first slanted surface with respect to the first surface is further preferably in a range between 5° and 15°. Similarly, the slanted angle $\theta_2$ of the second slanted surface with respect to the first surface is preferably in the range between 5° and 15°. Further, it is preferable that the first end region be arranged such that it extends lengthwise outward direction beyond a corresponding lengthwise end surface of the rotor. Similarly, the second end region may be arranged such that it extends lengthwise outward direction beyond a corresponding lengthwise end surface of the stator. It is further to be noted in this aspect of the present invention it is preferable that the first end region be defined to satisfy a relation $0.1 \leq a/L \leq 0.6$, where 2 L is a lengthwise dimension of the second surface and a is a lengthwise dimension of the first end region along the second surface. Further, it is preferable with respect to the second end region that the second end region is defined such that a relation $0.1 \leq a/L \leq 0.6$ is met, where a is a lengthwise dimension of the second end region.

The sintered body for forming a rare-earth permanent magnet can be used for forming a rare-earth permanent magnet by magnetizing the sintered body.

Effect of Invention

The rotary electric machine in accordance with the present invention includes a rare-earth permanent magnet arranged in the rotor having opposite lengthwise end surfaces in which at least one of the end surface is arranged such that it project in the lengthwise direction beyond the corresponding end surface of the rotor, and the rare-earth permanent magnet formed by sintering magnet material particles containing rare-earth materials has opposite lengthwise end portions wherein at least one of the end portions is slanted from the lengthwise end portion of the first surface toward lengthwise outward direction to thereby form a first slanted surface for providing a predetermined three dimensional configuration with the first surface having a length shorter than that of the second surface. The magnet is further divided into at least a central region, and a first end region extending from one end surface for a predetermined lengthwise distance. In the central region, the magnet material particles in the central region are such that magnetization axes of the magnet material particles included in the central region are oriented in a manner of parallel orientation wherein the magnetization axes of the magnet material particles are oriented substantially perpendicularly to the first surface which extends in the lengthwise direction, and in the first end region, the magnet material particles are oriented at least in a portion adjacent to the at least one end surface are oriented toward the first surface in such a manner that the magnetization axes of the magnet material particles are oriented substantially along the slanted angle of the first slanted surface, but in a portion adjacent to the central region, the magnet material particles are oriented such that the magnetization axes of the magnet material particles are oriented substantially perpendicularly to the first surface, and in a portion between the at least one end surface and the central region, the magnetization axes of the magnet material particles are oriented such that the orientation angle of the magnetization axes of the magnet material particles are gradually changed from the end surface to the central region and converged toward the first surface. Such structural arrangement of the present invention makes it possible to substantially reduce or suppress magnetic flux leakage in the axial direction of the rotary electric machine.

Further, the sintered body for forming a rare-earth permanent magnet can be used to form a rare-earth permanent magnet which is magnetized in the direction of the easy magnetization axes simply by magnetizing the sintered body. By assembling the magnetized rare-earth permanent magnet into a roto of a rotary electric machine, it is possible to form a rotary electric machine wherein axial magnetic flux leakage is substantially reduced or suppressed.

BRIEF DESCRIPTION OF DRAWINGS

FIG. 4 is a chart showing calculation models of rare-earth permanent magnet in accordance with the present invention and comparative examples.

FIG. 5 is a graph showing mean torque and rotor leakage magnetic flux in the electric motor using the rare-earth permanent magnet shown in FIG. 4.

FIG. 9 is a diagrammatic illustration of production processes for producing the sintered body for forming a rare-earth permanent magnet shown in FIG. 3 wherein (a) to (d) depict process steps up to formation of a green sheet.

FIG. 10 shows in sectional views a work sheet piece depicting orienting process steps for orienting the easy magnetization axes of the magnet material particles in accordance with one embodiment of the present invention.

FIG. 11 is a graph showing a preferable temperature increase in calcination process.

FIG. 12 (b) is a diagrammatical illustration showing a cavity configuration of a forming die used in the process of intermediate forming process in accordance with the example 1.

FIG. 12 (c) is a diagrammatical illustration showing a cavity configuration of a forming die used in the process of final forming process in the example 1.

DESCRIPTION OF EMBODIMENTS

Figure 1:
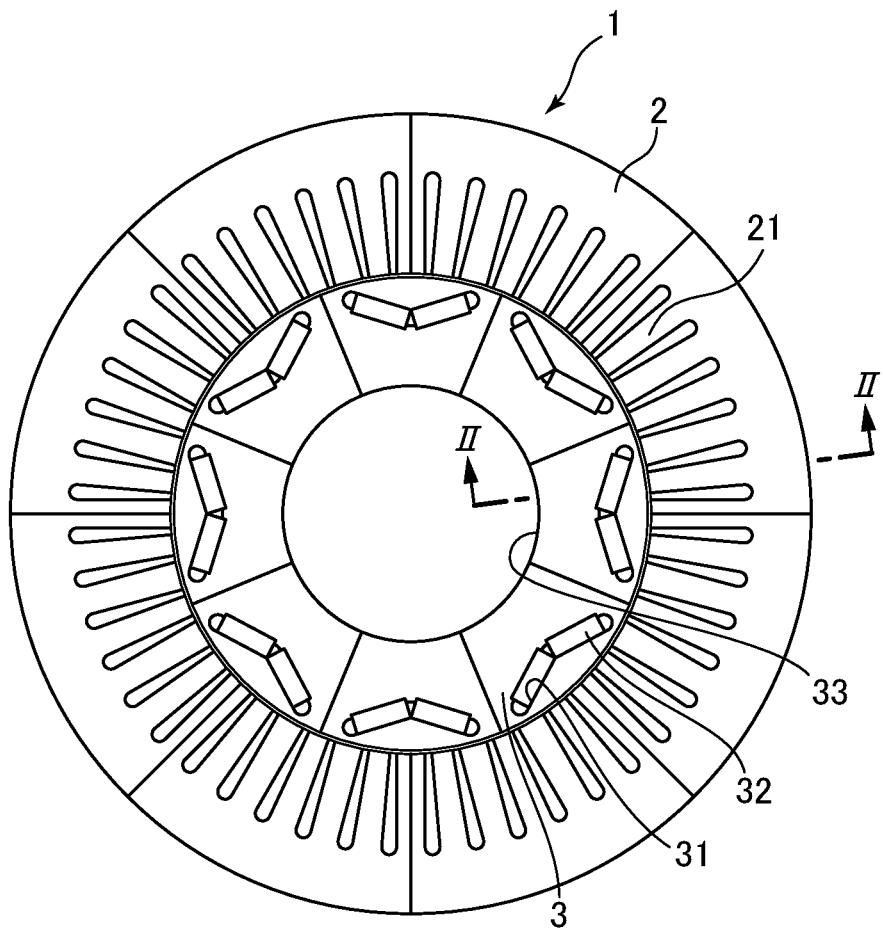
FIG. 1 is a diagrammatic end view showing an electric motor having rare-earth permanent magnets in accordance with one embodiment of the present invention.

The present invention will now be described with reference to embodiments shown in the drawings. FIG. 1 depicts an example of a rotary electric machine in which rare-earth permanent magnets in accordance with one embodiment of the present invention are assembled. In this embodiment, the rotary electric machine is constructed as an electric motor. Referring to FIG. 1, the electric motor 1 shown therein has an annular stator 2 and a rotor 3 arranged in the stator 2 for rotation therein. The stator 3 has an inner peripheral surface formed with a plurality of magnetic poles 21 which are arranged at circumferentially equidistant positions and projecting in radially inward direction. Each of the magnetic poles 21 has a coil (not shown) wound around the magnetic pole 21. The rotor 3 is formed at circumferentially equidistant positions adjacent to its outer peripheral surface with a plurality of magnet receiving slots 31. Each of the slots 31 receives a rare-earth permanent magnet 32 in accordance with one embodiment of the present invention. The rotor 3 is formed at its center position with an axially extending output shaft receiving bore 33, and an output shaft (not shown) is fixed to the axially extending bore 33.

Figure 2:
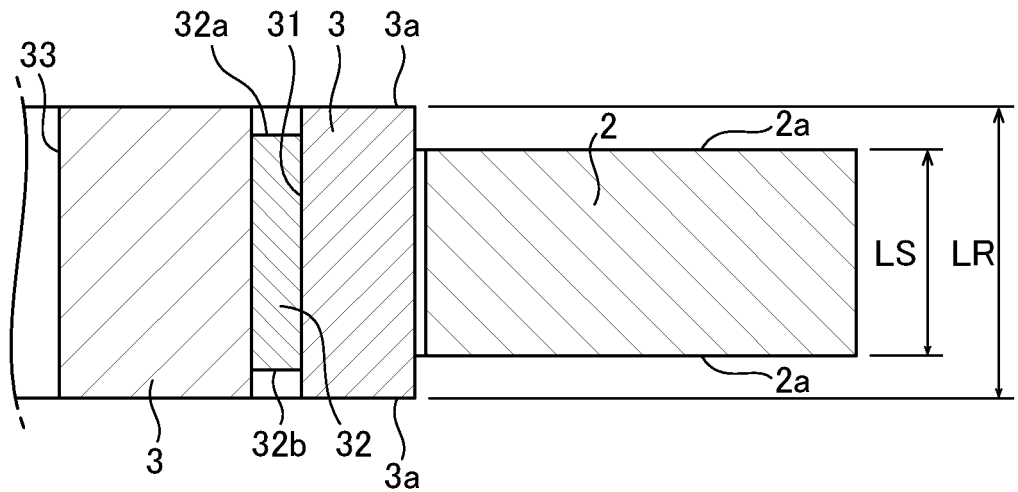
FIG. 2 is a sectional view of the electric motor taken substantially along a line II-II in FIG. 1.

In FIG. 2, there is shown a sectional view of the electric motor 1 shown in FIG. 1. Referring to FIG. 2, the electric motor 1 in accordance with this embodiment of the present invention has an axial length LS of the stator 2 which is shorter than an axial length of the rotor 3, so that the rotor 3 has opposite axial ends 3a which extend axially beyond the opposite ends 2a of the stator 2. The rare-earth permanent magnet 32 inserted into the magnet receiving slot 31 has an axial length which is shorter than the aforementioned axial length LR of the rotor 3 but longer than the axial length LS of the stator 2 so that axially opposite end surfaces 32a and 32b at the axially opposite end portions of the magnet 32 are located axially outwards of the axial end 2a of the stator 2. It has been known that, with an arrangement having the axial end portions 32a of the permanent magnet 32 disposed in the rotor 3 extending axially outwards beyond the end portions 2a of the stator 2, it is possible to prevent the magnetic flux in the rotor 3 from being leaked from the axial ends of the rotor 3. In the present embodiment, the electric motor 1 is of a magnet embedded type wherein the permanent magnet 32 is inserted into the magnet receiving slot 31 axially formed in the rotor 3, but a similar effect can be obtained even in an electric motor of surface magnet type wherein permanent magnets 32 are attached to the peripheral surface of the rotor 3.

The present invention is intended to suppress such axial leakage of the magnetic flux without such an arrangement of the permanent magnets or in addition to such an arrangement of the permanent magnets, by determining a shape of the permanent magnet and orientations of magnetized axes of the permanent magnet. The embodiment of the present invention will be described in the followings with respect to a magnet embedded type electric motor, however, it should be noted that the present invention can as well be applied to a surface magnet type electric motor. Further, the present invention can be applied not only to an electric motor but also to a generator, so that the term "rotary electric machine" is used to mean both an electric motor and a generator.

Figure 3:
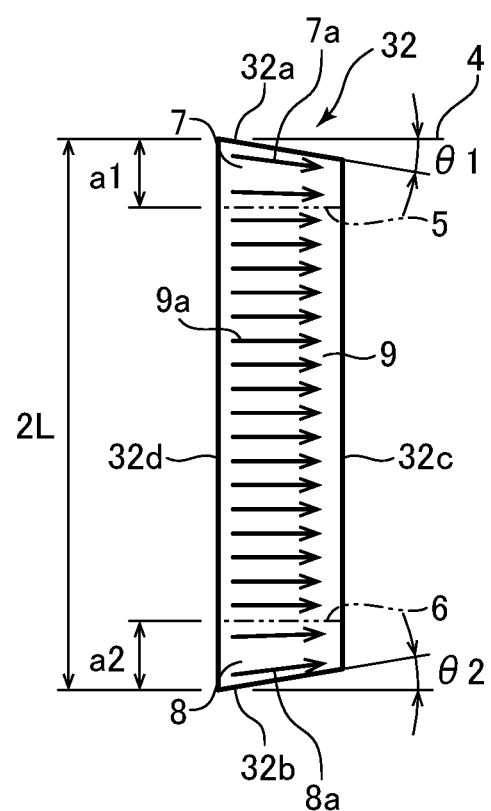
FIG. 3 is a side view of the rare-earth permanent magnet in accordance with the embodiment shown in FIG. 1 and depicting configuration of the rare-earth permanent magnet and orientations of magnetization axes.

The rare-earth permanent magnet 32 used in the present embodiment is a sintered magnet including fine particles of magnet materials which are integrally sintered and formed into a shape. As shown in FIG. 3, the rare-earth permanent magnet 32 includes a first surface 32c and a second surface 32d which are parallel each other. The rare-earth permanent magnet 32 further includes the aforementioned end surfaces 32a at the opposite end portions thereof. In the rare-earth permanent magnet 32, the end surface 32a is in the form of a slanted surface which is slanted with respect to a line 4 perpendicular to the first surface at an angle $\theta_1$. Similarly, the end surface 32b is in the form of a slanted surface which is slanted with respect to the line 4 perpendicular to the first surface at an angle $\theta_2$. The angle $\theta_2$ may be identical with the angle $\theta_1$. Each of the slanted angles $\theta_1$ and $\theta_2$ may be in the range between 5° and 45°, preferably in a range between 5° and 35°, and more preferably in the range between 5° and 45°. As a result, the rare-earth permanent magnet 32 is formed into a shape having a trapezoidal cross-sectional configuration wherein the first surface 32c is shorter than the second surface 32d.

A rare-earth permanent magnet such as an Nd—Fe—B type magnet is formed by sintering particles of magnet materials having predetermined compositions into a desired shape, and then magnetizing the magnet material particles. The magnet material particles have easy magnetization axes, and the respective magnet material particles are magnetized to have magnetization axes in the directions of the easy magnetization axes by applying an external magnetic field. According to the present invention, the feature is not only to determine the shape of the magnet but also to determine the orientations of the magnetized axes of the magnet material particles. More specifically, as shown in FIG. 3, the rare-earth permanent magnet 32 has a first end region 7 defined by an imaginary line 5 drawn in a direction perpendicular to the second surface 32d from a point on the second surface 32d apart from an end on the end surface 32a by a distance a1, a second end region 8 defined by an imaginary line 6 drawn in a direction perpendicular to the second surface 32d from a point on the second surface 32d apart from an end on the end surface 32b by a distance a2, and a central region 9 defined between the end regions 7 and 8.

In FIG. 3, there are shown orientations of the magnetization axes of the magnet material particles in the aforementioned end regions 7 and 8 and the central region 9. In the central region 9, the magnetized axes are directed substantially perpendicularly to the second surface 32d as shown by arrows 9a to provide a parallel orientation directed toward the first surface 32c. On the other hand, in the end region 7, the directions of the magnetization axes in a portion adjacent to the slanted end surface 32a are slanted as shown by an arrow 7a in FIG. 3 substantially along the direction of the end surface 32a by a slanted angle $\theta_1$ to provide a slanted orientation directed from the second surface 32d to the first surface 32c. Further, in a portion adjacent to the central region 9, the magnetization axes of the magnet material particles are directed toward the first surface 32c and oriented substantially perpendicularly to the second surface 32d as shown by an arrow 7b. In an intermediate portion from the portion adjacent to the end surface 32a to the portion adjacent to the central region 9, the orientations are such that the slanted angle $\theta$ is gradually changed from the angle $\theta_1$ to a value 0. Similarly, in the end region 8, the directions of the magnetization axes in a portion adjacent to the slanted end surface 32b are slanted as shown by an arrow 8a in FIG. 3 substantially along the direction of the end surface 32b by a slanted angle $\theta_2$ to provide a slanted orientation directed from the second surface 32d to the first surface 32c. Further, in a portion adjacent to the central region 9, the magnetization axes of the magnet material particles are directed toward the first surface 32c and oriented substantially perpendicularly to the second surface 32d as shown by an arrow 8b. In an intermediate portion from the portion adjacent to the end surface 32b to the portion adjacent to the central region 9, the orientations are such that the slanted angle $\theta$ is gradually changed from the angle $\theta_2$ to a value 0.

In a magnet constructed as described above, it is possible to decrease axial leakage of rotor magnetic flux by determining the ratio k=[(a1 or a2)/L] to be in the range of 0.1 to 0.6, where "2L" is the axial length of the second surface 32d, and "a1" and "a2" are respectively axial lengths of the end regions 7 and 8, under a condition of magnet quantity being identical. As the value of the ratio K becomes larger, the effect of the slanted orientations of the magnetization axes on suppressing axial magnetic flux leakage becomes lower, and with the value k above 0.6, tendency of change in the effect on suppressing magnetic flux leakage becomes substantially flat. In a range where the ratio k is lower than 0.1, it is difficult to control orientation of the magnetization axes in manufacturing magnets.

[Determination of a Calculation Model]

In a rare-earth permanent magnet having a structure shown in FIGS. 1 to 3, the following conditions have been determined to provide a calculation model for calculating axial magnetic flux leakage.

| member | axial dimension (mm) | material |
|---|---|---|
| stator | 50 | steel plate 50JN1300 available from JFE Steel Co.. |
| rotor | 60 | steel plate 50JN1300 available from JFE Steel Co. |
| magnet length | 56 | neodymium magnet NEOREC38SH |
| thickness | 6.68 | available from TDK Co. |

The length of the magnet is that of a magnet having end surfaces each being perpendicular to the axially extending surface, so that with the dimensions as determined above, each axial end of the magnet extends by 3 mm from the axial end portion of the stator. This model is adopted as the comparative example 1. In the case of a magnet corresponding to the embodiment of the present invention having slanted end surfaces, two calculation models have been provided with different slanted angle $\theta$ but having the same magnet quantity as the comparative example 1. These calculation models have been adopted as the calculation models 1 and 2, respectively. The calculation model 1 is an example having an axial length a of 4 mm which corresponds to the length a1 of the end region 7 shown in FIG. 3b, with the axial length b of the end region 7 at the first surface 32c being 2 mm. On the other hand, the calculation model 2 is an example having an axial length a of 3.5 mm, with the axial length b of the end region 7 at the first surface 32c being 2.5 mm. In both the calculation models 1 and 2, it has been determined that the portion of the end region 7 of the magnet extend axially beyond a corresponding axial end surface 2a of the stator. In order for comparing with the calculation models of the present invention, comparative examples 2 and 3 have been provided. The comparative example 2 had a magnet configuration with an end region 7 comprising a straight portion of a length of 2.395 mm and an arcuate end portion of a radius of curvature of 6.68 mm which was formed at the end portion of the straight portion. On the other hand, the comparative example 3 had a magnet configuration with an end region 7 comprising a straight portion of a length of 2.616 mm and an arcuate end portion of a radius of curvature of 10.02 mm which was formed at the end portion of the straight portion. In addition, a magnet model has been provided with end portion of the magnet being flush with corresponding end surfaces of the stator. This model has been adopted as the comparative example 4. The constructions of the calculation models 1 and 2 of the embodiment of the present invention and those of the comparative examples 1 to 4 are shown in FIG. 4.

The coil wound on each magnetic pole is comprised of a copper wire, having a number of turns of 11 and the resistance of 0.064. With these conditions, mean torque and rotor magnetic flux leakage in the electric motor have been determined using an electro-magnetic field analyzing software JMAG available from K.K. JSOL.

In calculation, it has been assumed that there is an air region which axially extends for a distance 1.1 times lager the axial length of the calculation model. Specifically, an assumption has been made that there is an air region of 3 mm externally of the rotor at each axial end portion of the rotor, and that there is an air region of 2.5 mm externally of the stator at each axial end portion of the stator. As a condition for driving in the calculation, assumption has been made such that a three phase AC power of an amplitude of 212.1 A and an effective value of 150 A has been applied with an advance angle $\beta=45°$ and a frequency corresponding to a rotational speed of 1000 rpm. The calculation has been made only on one of the end portions.

The results of the calculation are shown in FIGS. 5(a) and (b). FIG. 5(a) is a graph showing mean torque of the electric motor. As shown, the mean torque is the lowest in the comparative example 4, and highest in the comparative example 1. The comparative example 1 has an arrangement wherein the magnet end portion extends beyond the end surface of the stator and shows a mean torque which is about 2.9% higher than the comparative example 4. The comparative examples 2 and 3 show a mean torque slightly lower than that of the comparative example 1, but the decrease is only about 0.4% and 0.2%, respectively. FIG. 5(b) is a graph showing axial leakage of the magnetic flux from the rotor. It is noted that the comparative examples 1 to 3 show magnetic flux leakage which is about 44% lower than that of the comparative example 4. This is an advantageous result obtainable by having the magnet end portion extend beyond the end surface of the stator. Further, in the calculation models 1 and 2 of the present invention, it is noted that the magnetic flux leakage can be decreased by about 65.5% and 29.7%, respectively, as compared with the comparative examples 1 to 3. This is an advantageous results obtainable by having the magnet end surface slanted. In comparing the calculation models 1 and 2, it is noted that the effect of reducing the magnetic flux leakage can be enhanced as the slanted angle of the end surface increases.

Therefore, the inventors have conducted an investigation on the relationship between the reduction rate of the magnetic flux leakage and the slanted angle of the magnet end surface using the electro-magnetic field analyzing software JMAG supplied by K.K. JSOL.

Figure 6:
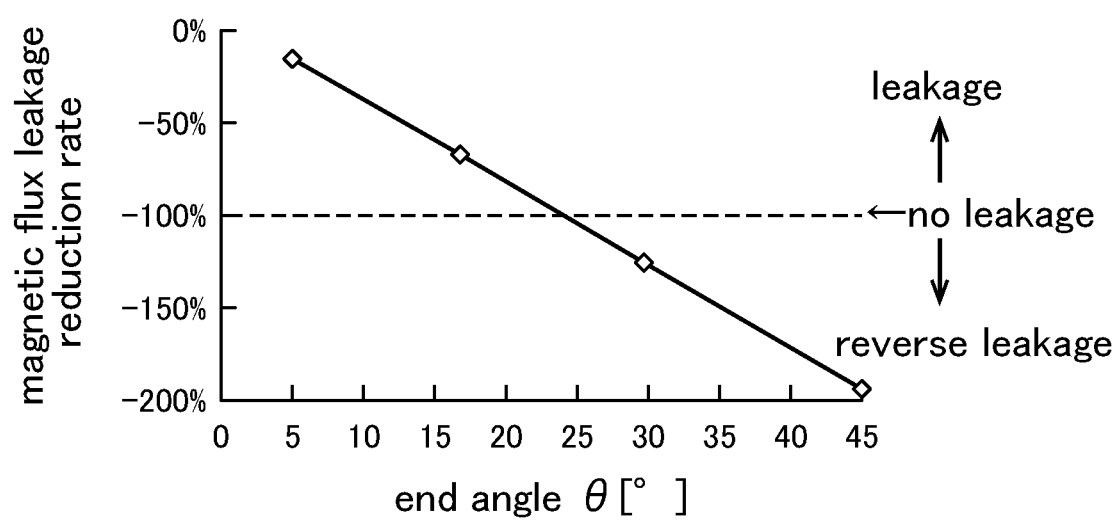
FIG. 6 shows a relationship between the slanted angle and reduction of rotor magnetic flux leakage.

In FIG. 6, there is shown a magnetic flux leakage reduction rate as compared with the comparative example 1. As shown in FIG. 6, the magnetic flux leakage reduction rate starts to increase as the slanted angle $\theta$ of the end surface exceeds 5° and reaches 100% at around the slanted angle $\theta$ of about 25° which means that there is no magnetic flux leakage. If the slanted angle $\theta$ is further increased beyond this value, the magnetic flux leakage occurs in the reversed direction. Then, with the slanted angle $\theta$ around 45°, the magnetic flux leakage is approximately equal to the comparative example 1. As noted in the investigation, it is preferred that the slanted angle $\theta$ of the magnet end surface is in the range of 5° to 45°, more preferably 10° to 35°, further preferably 15° to 30°.

Figure 7:
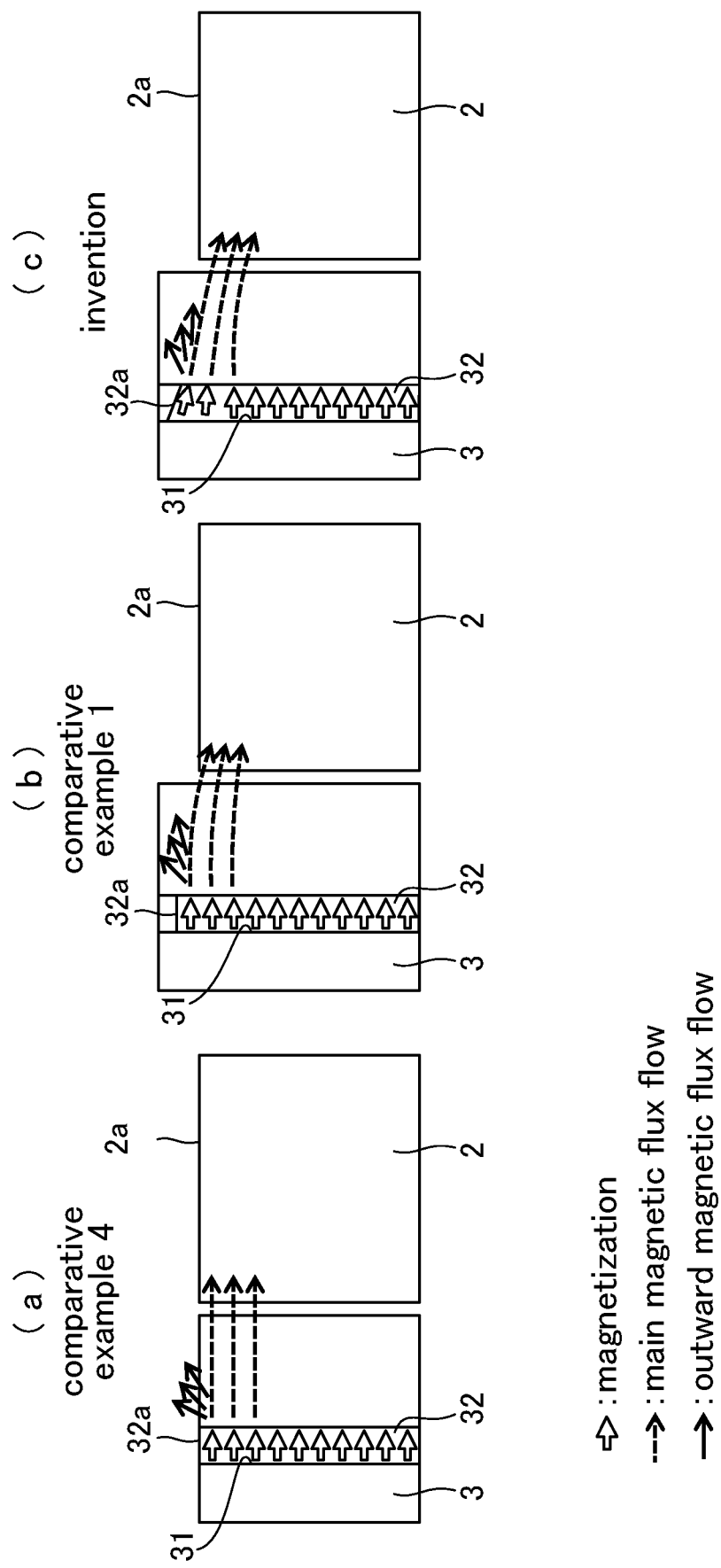
FIG. 7 shows magnetic flux leakage from the rotor in a prior art and the present invention.

FIG. 7 is a diagrammatical illustration of the rotor magnetic flux leakage, wherein FIG. 7(a) shows the magnetic flux leakage in the comparative example 4, FIG. 7(b) that in the comparative example 1, and FIG. 7(c) that in the present invention. As shown in FIG. 7(a), in the arrangement of the comparative example 4, the magnetic flux from the rotor 3 flows in the vicinity of the end surface in parallel with the end surface toward the stator 2 so that a portion of the flux leaks axially outwards. With an arrangement having the magnet end portion extended axially beyond the end surface 2a of the stator 2 as in the case of the comparative example 1 shown in FIG. 7(b), the magnetic flux in the vicinity of the end portion which is directed from the rotor to the stator tends to flow axially inwards and the magnetic flux leaking outwardly from the rotor also directed inwardly, so that the leakage of the magnetic flux is decreased. According to the present invention shown in FIG. 7(c), the magnetization axes are oriented axially inwards in the vicinity of the end portion of the magnet, so that the magnetic flux directed from the rotor to the stator in the vicinity of the end surface has an increased tendency of being directed axially inwardly. Thus, the magnetic flux directed axially outwardly is also strongly forced to flow inwardly.

Figure 8:
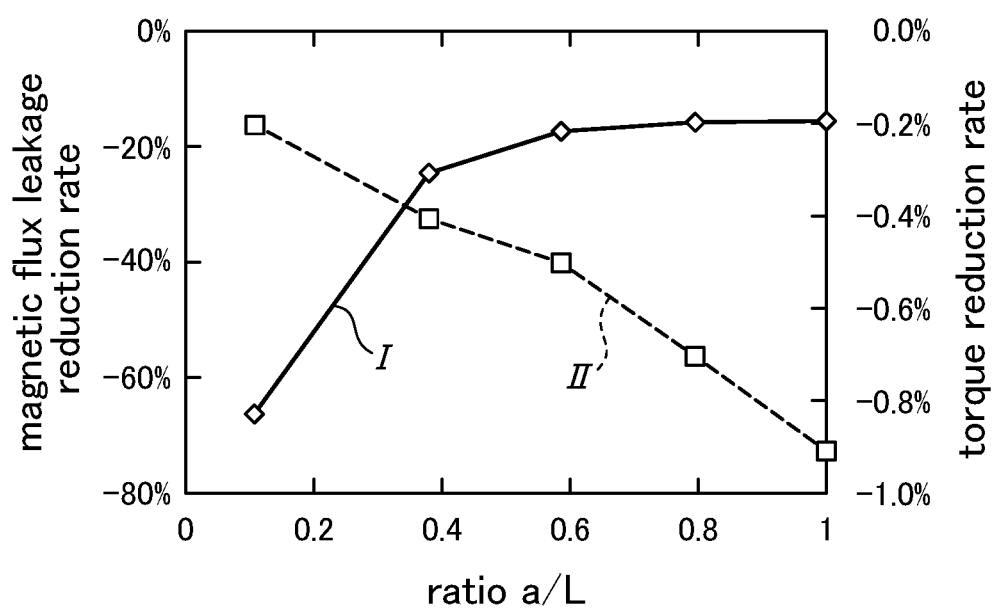
FIG. 8 is a diagram showing a relationship between a ratio a/L of the end region length a to the overall length L and magnetic flux leakage reduction and the electric motor torque reduction.

The inventors have further conducted investigations on the effect of the ratio a/L which is a ratio of the end region a of the magnet 32 and a half of the second surface 32d of the magnet 32 on the magnetic flux leakage reduction rate, as well as the relationship between the ratio a/L and the torque of the electric motor. The results are shown in FIG. 8. In FIG. 8, the curve I shows the relationship between the ratio a/L and the magnetic flux leakage reduction rate, in comparison with the comparative example 1. It is noted that in the range of the ratio a/L between 0.1 and 0.6, the effect on the reduction of magnetic flux leakage is significant. However, in the range wherein the ratio is larger than 0.6, there is no increase in the effect of the magnetic flux reduction rate. To the contrary, the reduction rate of the torque gradually increases as the ratio a/L increases from the value 0.1. Therefore, it is noted that the range of the ratio a/L above 0.6 is not preferable in view of the results of the investigation that the increase in the magnetic flux reduction effect cannot be expected in this range. Thus, it is preferred that the value of the ratio a/L be in the range between 0.1 and 0.6. More preferably, the range is between 0.1 and 0.4.

[Production Method for Rare-Earth Permanent Magnet-Forming Sintered Body]

Next, with reference to FIG. 9, a production method for the rare-earth permanent magnet-forming sintered body 5a according to the first embodiment in FIG. 4(a) will be described. FIG. 9 is a schematic diagram depicting a production process of the permanent magnet-forming sintered body 5a according to the first embodiment.

First of all, an ingot of a magnet material comprised of an Nd—Fe—B based alloy having a given mixing ratio is produced by a known casting process. Typically, the Nd—Fe—B based alloy usable for a neodymium magnet has a composition comprising 30 wt % of Nd, 67 wt % of Fe which is preferably electrolytic iron, and 1.0 wt % of B. Subsequently, this ingot is coarsely pulverized to a size of about 200 μm, using heretofore-known means such as a stamp mill or a crusher. Alternatively, the ingot may be melted and subjected to a strip casting process to produce flakes, and then the flakes may be coarsely powdered by a hydrogen cracking process. In this way, coarsely-pulverized magnet material particles 115 are obtained (see FIG. 9(a)).

Subsequently, the coarsely-pulverized magnet material particles 115 are finely pulverized by a heretofore-known pulverization method such as a wet process using a bead mill 116, or a dry process using a jet mill. For example, in the fine pulverization based on a wet process using a bead mill 116, a solvent is filled in the bead mill 116 charged with beads 116a as a pulverizing medium, and the coarsely-pulverized magnet material particles 115 is input into the solvent. Then, the coarsely-pulverized magnet material particles 115 are finely pulverized, in the solvent, to a particle size falling within a given range (e.g., 0.1 μm to 5.0 μm), to thereby disperse the resulting magnet material particles in the solvent (see FIG. 7(b)). Subsequently, the magnet material particles contained in the solvent after the wet pulverization are dried by drying mean such as vacuum drying, and the dried magnet material particles are extracted (not depicted). A type of solvent usable in the pulverization is not particularly limited. For example, it is possible to use: alcohols such as isopropyl alcohol, ethanol and methanol; esters such as ethyl acetate; lower hydrocarbons such as pentane and hexane; aromatics such as benzene, toluene and xylene; and ketones; and mixtures thereof. The solvent is not limited to an organic solvent. For example, it is possible to use a liquefied inert gas such as liquefied argon, and other inorganic solvents. In any case, it is preferable to use a solvent containing no oxygen atom therein.

On the other hand, in the fine pulverization based on a dry process using a jet mill, the coarsely-pulverized magnet material particles 115 are finely pulverized by the jet mill, in (a) an atmosphere consisting inert gas such as nitrogen gas, Ar gas or He gas, wherein an oxygen content of the inert gas is substantially 0%, or (b) an atmosphere consisting inert gas such as nitrogen gas, Ar gas or He gas, wherein an oxygen content of the inert gas is in the range of 0.001 to 0.5%, and formed as fine particles having an average particle size falling within a given range, such as 0.7 μm to 5.0 μm. As used herein, the term "the concentration of oxygen is substantially 0%" does not limitedly mean that the concentration of oxygen is absolutely 0%, but means that oxygen may be contained in an amount to an extent that it very slightly forms an oxide layer on surfaces of the fine particles.

Subsequently, the magnet material particles finely pulverized by the bead mill 116 or other pulverizing means are formed into a desired shape. For shaping of the magnet material particles, a mixture obtained by mixing the finely-pulverized magnet material particles 115 and a binder together is preliminarily prepared. As the binder, it is preferable to use a resin material. In the case where a resin is used as the binder, it is preferable to use a polymer containing no oxygen atom in its structure and having a depolymerization property. Further, it is preferable to use a thermoplastic resin so as to enable a residue of the mixture of the magnet material particles and the binder, occurring when the mixture is formed into a desired shape such as a rectangular parallelepiped shape, as described later, to be reused, and enable magnetic field orientation to be performed under a condition that the binder is softened as a result of heating the mixture. More specifically, a polymer is suitably used which comprises one or more polymers or copolymers formed from a monomer represented by the following general formula (1):

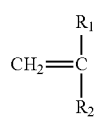

(1)

(where each of R1 and R2 denotes one of a hydrogen atom, a lower alkyl group, a phenyl group and a vinyl group.)

Examples of a polymer meeting the above conditions include: polyisobutylene (PIB) as a polymer of isobutylene; polyisoprene (isoprene rubber (IR)) as a polymer of isoprene; polybutadiene (butadiene rubber (BR)) as a polymer of 1,3-butadiene; polystyrene as a polymer of styrene; a styrene-isoprene-styrene block copolymer (SIS) as a copolymer of styrene and isoprene; butyl rubber (IIR) as a copolymer of isobutylene and isoprene; a styrene-isobutylene-styrene copolymer which is a copolymer of styrene and isobutylene; a styrene-butadiene-styrene block copolymer (SBS) as a copolymer of styrene and butadiene; a styrene-ethylene-butadiene-styrene copolymer (SEBS) as a copolymer of styrene, ethylene and butadiene; a styrene-ethylene-propylene-styrene copolymer (SEPS) as a copolymer of styrene, ethylene and propylene; an ethylene-propylene copolymer (EPM) as a copolymer of ethylene and propylene; EPDM obtained by copolymerizing diene monomers together with ethylene and propylene; polyethylene as a polymer of ethylene; polypropylene as a polymer of propylene; a 2-methyl-1-pentene polymerized resin as a polymer of 2-methyl-1-pentene; a 2-methyl-1-butene polymerized resin as a polymer of 2-methyl-1-butene; and an α-methylstyrene polymerized resin as a polymer of α-methylstyrene. A resin to be used as the binder may have a composition containing a polymer or copolymer of monomers containing an oxygen atom and/or a nitrogen atom (e.g., poly(butyl methacrylate) or poly(methyl methacrylate)) in a small amount. Further, a monomer which does not meet the general formula (1) may be partially copolymerized. Even in such a situation, it is possible to achieve the object of the present invention.

As a resin to be used as the binder, it is desirable, from a viewpoint of adequately performing magnetic field orientation, to use a thermoplastic resin capable of being softened at a temperature of 250° C. or less (i.e., having a softening temperature of 250° C. or less), more specifically a thermoplastic resin having a glass-transition temperature or flow starting temperature of 250° C. or less.

In order to disperse the magnet material particles over the thermoplastic resin, it is desirable to add a dispersant in an appropriate amount. As the dispersant, it is desirable to add at least one selected from the group consisting of alcohol, carboxylic acid, ketone, ether, ester, amine, imine, imide, amide, cyanogen, phosphorous functional group, sulfonic acid, a compound having an unsaturated bond such as a double bond or a triple bond, and a liquid, saturated hydrocarbon compound. Two or more of them may be used in the form of a mixture. Further, in advance of aftermentioned operation of applying a magnetic field to the mixture of the magnet material particles and the binder to thereby magnetically orient the magnet material particles, the mixture is heated to allow such magnetic field orientation treatment to be performed under a condition that the binder component is softened.

By using a binder satisfying the above conditions to serve as the binder to be mixed with the magnet material particles, it is possible to reduce an amount of carbon and an amount of oxygen remaining in a rare-earth permanent magnet-forming sintered body after sintering. Specifically, an amount of carbon remaining in a rare-earth permanent magnet-forming sintered body after sintering can be reduced to 2000 ppm or less, more preferably 1000 ppm or less. Further, an amount of oxygen remaining in a rare-earth permanent magnet-forming sintered body after sintering can be reduced to 5000 ppm or less, more preferably 2000 ppm or less.

An addition amount of the binder is set to a value capable of, when shaping a slurry-form or heated and melted compound, filling gaps among the magnet material particles so as to provide improved thickness accuracy to a shaped body obtained as a result of the shaping. For example, a ratio of the binder to a total amount of the magnet material particles and the binder is set in the range of 1 wt % to 40 wt %, more preferably in the range of 2 wt % to 30 wt %, still more preferably in the range of 3 wt % to 20 wt %.

In the following example, the mixture is formed into a shape other than that of an intended product once, and a magnetic field is applied to the resulting shaped body to orient easy magnetization axes of the magnet material particles, whereafter the resulting shaped body is subjected to shaping and sintering to obtain a product having a desired shape as depicted, for example, in FIG. 4. Particularly, in the following example, the mixture comprising the magnet material particles and the binder, i.e., a compound 117, is formed into a sheet-like green (unprocessed or untreated) shaped body (hereinafter referred to as "green sheet" or "shaping process sheet") once, and then further formed into a shape for the orientation treatment. For forming the mixture, particularly, into a sheet shape, it is possible to employ a forming method using, for example, a hot-melt coating process which comprises heating the compound 117, i.e., the mixture of the magnet material particles and the binder, and then coating the resulting melt onto a substrate to thereby form the melt into a sheet shape, or a slurry coating process which comprises coating a slurry containing the magnet material particles, the binder and an organic solvent, on a substrate, to thereby form the slurry into a sheet shape.

In the following description, one example of the production process will be described in connection with formation of the green sheet using, particularly, the hot-melt coating process. However, the forming method in the present invention is not limited to such a specific coating process. For example, a green sheet may not necessarily be formed from the compound, but the compound may be introduced into a forming die, and forming process may be carried out by heating from the room temperature to 100° C. under a pressure of 1 to 10 MPa.

A binder is mixed with the magnet material particles finely pulverized using the bead mill 116 or other pulverizing means, to prepare a clayey mixture comprising the magnet material particles and the binder, i.e., a compound 117, as mentioned above. In this process, it is possible to use, as the binder, a mixture of a resin and a dispersant as mentioned above. As one example of the binder, it is preferable to use a thermoplastic resin comprising a polymer containing no oxygen atom in its structure and having a depolymerization property. Further, as the dispersant, it is preferable to add at least one selected from the group consisting of alcohol, carboxylic acid, ketone, ether, ester, amine, imine, imide, amide, cyanogen, phosphorous functional group, sulfonic acid, and a compound having an unsaturated bond such as a double bond or a triple bond. As to an addition amount of the binder, in the compound 117 after addition of the binder, a ratio of the binder to a total amount of the magnet material particles and the binder is set in the range of 1 wt % to 40 wt %, more preferably in the range of 2 wt % to 30 wt %, still more preferably in the range of 3 wt % to 20 wt %, as mentioned above.

Further, an addition amount of the dispersant is preferably determined depending on a particle size of the magnet material particles, wherein it is recommended to increase the addition amount as the particle size of the magnet material particles becomes smaller. Specifically, the addition amount may be set in the range of 0.1 parts to 10 parts, preferably in the range of 0.3 parts to 8 parts, with respect to 100 parts of the magnet material particles. If the addition amount is excessively small, a dispersion effect becomes poor, possibly leading to deterioration in orientation property. On the other hand, if the addition amount is excessively large, the dispersant is likely to contaminate the magnet material particles. The dispersant added to the magnet material particles adheres onto surfaces of the magnet material particles, and acts to facilitate dispersion of the magnet material particles to provide the clayey mixture, and to assist turning of the magnet material particles in the aftermentioned magnetic field orientation treatment. As a result, it becomes possible to facilitate orientation during application of a magnetic field so as to uniform respective directions of easy magnetization axes of the magnet material particles, into approximately the same direction, i.e., so as to increase the degree of orientation. Particularly, in the case where the binder is mixed with the magnet material particles, the binder is present around the surfaces of the magnet material particles, so that a frictional force against the magnet material particles during the magnetic field orientation treatment is increased, thereby possibly leading to deterioration in orientation property of the magnet material particles. Thus, the effect arising from addition of the dispersant becomes more important.

Preferably, the mixing of the magnet material particles and the binder is performed in an atmosphere consisting of inert gas such as nitrogen gas, Ar gas or He gas. As one example, the mixing of the magnet material particles and the binder is performed by inputting the magnet material particles and the binder into a stirring machine and stirring them using the stirring machine. In this case, with a view to enhancing kneading performance, heating-stirring (stirring under heating) may be performed. It is also desirable to perform the mixing of the magnet material particles and the binder, in an atmosphere consisting of inert gas such as nitrogen gas, Ar gas or He gas. Particularly, in the case where the coarsely-pulverized magnet material particles are finely pulverized by a wet process, the compound 117 may be obtained by adding the binder to a solvent used for pulverization, without extracting the magnet material particles from the solvent, and, after kneading the resulting mixture, volatilizing the solvent.

Subsequently, the compound 117 is formed into a sheet shape to prepare the aforementioned green sheet. Specifically, in case of employing the hot-melt coating process, the compound 117 is heated and melted to have flowability, and then coated on a support substrate 118. Subsequently, the compound 117 is solidified according to heat dissipation to form a long strip-shaped green sheet 119 on the support substrate 118. In this case, although a temperature during heating and melting of the compound 117 varies depending on a type and an amount of a binder used, it is typically set in the range of 50 to 300° C. In this case, it is to be understood that the temperature needs to be set to a value greater than the flow starting temperature of the binder used. On the other hand, in case of employing the slurry coating process, a slurry obtained by dispersing the magnet material particles, the binder and optionally an additive for facilitating the orientation, over a large volume of solvent is coated on the support substrate 118. Subsequently, the slurry is subjected to drying to volatilize the solvent therefrom to thereby form a long strip-shaped green sheet 119 on the support substrate 118.

As a coating system for the melted compound 117, it is preferable to use a system having excellent layer thickness controllability, such as a slot-die system or a calender roll system. Particularly, in order to realize high thickness accuracy, it is desirable to use a die system or a comma coating system which is a system having particularly excellent layer thickness controllability, i.e., a system capable of coating a layer having a highly-accurate thickness, on a surface of a substrate. For example, in the slot-die system, the compound 117 after being heated to have flowability is pressure-fed from a gear pump into a die, and discharged from the die to perform coating. On the other hand, in the calender roll system, the compound 117 is fed into a nip gap between two heated rolls, in a controlled amount, and the rolls are rotated to coat the compound 117 melted by heat of the rolls, onto the support substrate 118. As one example of the support substrate 118, it is preferable to use a silicone-treated polyester film. Further, it is preferable to use a defoaming agent or perform a vacuum heating defoaming process to sufficiently defoam a layer of the coated and developed compound 117 so as to prevent gas bubbles from remaining in the layer. Alternatively, the melted compound 117 may be extruded onto the support substrate 118 while being formed into a sheet shape, by an extrusion forming or injection forming, instead of being coated on the support substrate 118, to thereby form the green sheet 119 on the support substrate 118.

In the example depicted in FIG. 9, coating of the compound 117 is performed using a slot-die 120. In a step of forming the green sheet 119 using this slot-die system, it is desirable to actually measure a sheet thickness of the coated green sheet 119, and adjust a nip gap between the slot-die 120 and the support substrate 118, by feedback control based on the actually-measured value. In this case, it is desirable to reduce a variation in an amount of the flowable compound 117 to be fed to the slot-die 120, as small as possible, e.g., to ±0.1% or less, and further reduce a variation in coating speed as small as possible, e.g., to ±0.1% or less. This control makes it possible to improve the thickness accuracy of the green sheet 119. As one example, with respect to a design value of 1 mm, the thickness accuracy of the green sheet 119 may be within ±10%, preferably within ±3%, more preferably within ±1%. In the calender roll system, a film thickness of the compound 117 to be transferred to the support substrate 118 can be controlled by feedback-controlling calendering conditions based on an actually-measured value in the same manner as that described above.

Preferably, the thickness of the green sheet 119 is set in the range of 0.05 mm to 20 mm. If the thickness is reduced to less than 0.05 mm, it becomes necessary to laminate a plurality of layers so as to achieve a required magnet thickness, resulting in deteriorated productivity.

Subsequently, the green sheet 119 formed on the support substrate 118 by the hot-melt coating process is cut into a processing sheet piece 123 having a size corresponding to a desired magnet size. In this example, the processing sheet piece 123 comprises a sectional configuration including a straight region 9a having a length corresponding to that of the central region 9 of the rare-earth permanent magnet 32, and two arcuate regions 7b, 8b each extending from a respective one of opposite ends of the straight region 9a as shown in FIG. 10(a). The processing sheet piece 123 has a widthwise dimension in a direction perpendicular to the sheet of the drawing, the sectional dimension and the widthwise dimension are determined taking reference to a possible shrinkage during the sintering process such that a desired magnet dimensions can be obtained after the sintering process.

A parallel magnetic field 121 is applied to the processing sheet piece 123 depicted in FIG. 10(a), in a direction orthogonal to surfaces of the linear portions 9a. Through this magnetic field application, easy magnetization axes of the magnet material particles included in the processing sheet piece 123 are oriented in the direction of the magnetic field, as depicted by the arrowed lines 122 in FIG. 10(a). Specifically, the processing sheet piece 123 is placed in a magnetic field application die (not depicted) having a cavity having a shape corresponding to that of the processing sheet piece 123, and heated to soften the binder contained in the workpiece 123. More specifically, the processing sheet piece 123 is heated until a viscosity of the binder contained in the processing sheet piece 123 becomes 1 to 1500 Pa·s, more preferably 1 to 500 Pa·s to thereby soften the binder. This enables the magnet material particles to be turned within the binder, i.e., enables the easy magnetization axes of the magnet material particles to be oriented in directions along the parallel magnetic field 121.

In this process, although a temperature and a time for heating the workpiece 123 may vary depending on a type and an amount of a binder used, they may be set, respectively, to 40 to 250° C. and 1 to 60 minutes, for example. In either case, for softening the binder contained in the processing sheet piece 123, the heating temperature needs to be set to a value equal to or greater than a glass-transition temperature or flow starting temperature of the binder used. Examples of means to heat the processing sheet piece 123 include a heating system using a hot plate, and a system using, as a heat source, a heating medium such as silicone oil. The magnetic field intensity during the magnetic field application may be set in the range of 5000 [Oe] to 150000 [Oe], preferably in the range of 10000 [Oe] to 120000 [Oe]. As a result, the easy magnetization axes of the magnet material particles included in the processing sheet piece 123 are oriented in parallel alignment in directions along the parallel magnetic field 121, as depicted in FIG. 10(a). This magnetic field application step may be configured such that a magnetic field is simultaneously applied to a plurality of the processing sheet pieces 123. In this case, the parallel magnetic field 121 may be simultaneously applied, using a die having a plurality of cavities or a plurality of dies arranged side-by-side. The step of applying a magnetic field to the processing sheet piece 123 may be performed in concurrence with the heating step, or during a period after completion of the heating step and before solidification of the binder of the processing sheet piece 123.

Subsequently, the processing sheet piece 123 in which the easy magnetization axes of the magnet material particles thereof are oriented in parallel alignment as indicated by the arrowed line 122 through the magnetic field application step depicted in FIG. 10(a) is extracted from the magnetic field application die, and transferred into a final shaping die having a trapezoidal-shaped cavity 124 having an elongate length dimension as shown in FIG. 10(b) corresponding to the linear central region 9, and simultaneously the linear portions 123b, 123c are linearly aligned with the central region. In the sintering sheet piece formed through the shaping step, easy magnetization axes of magnet material particles included in a region corresponding to the central region 9a are maintained in a parallel orientation wherein the easy magnetization axes are oriented in parallel with the thickness direction, but in the opposite end regions 7b and 8b, the upwardly convex configuration shown in FIG. 10(a) is deformed into a straight configuration contiguous with the central straight region. As a result, the easy magnetization axes in the portion adjacent to the end surfaces 125a, 125b are oriented in a slanted manner substantially along the slanted end surfaces, and in the portion adjacent to the central region 9a, they are oriented substantially along the parallel orientation in the central region 9a as depicted in FIG. 10(b). Further, in the intermediate region from the portions adjacent to the end surfaces 125a, 125b to the portions adjacent to the central region 9a, the orientations of the easy magnetization axes of magnet material particles are gradually changed from the slanted orientation to the substantially parallel orientation.

The oriented sintering sheet piece 125 in which the easy magnetization axes of the magnet material particles thereof are oriented in the above manner is subjected to calcining treatment in a non-oxidizing atmosphere adjusted at atmospheric pressure, or a pressure greater or less than atmospheric pressure (e.g., at 1.0 Pa or 1.0 MPa) at a decomposition temperature of the binder for a holding time of several hours to several ten hours (e.g., 5 hours). In this treatment, it is recommended to use a hydrogen atmosphere or a mixed gas atmosphere of hydrogen and inert gas. In the case where the calcining treatment is performed in a hydrogen atmosphere, a supply amount of hydrogen during the calcining treatment is set, for example, to 5 L/min. The calcining treatment makes it possible to remove organic compounds contained in the binder by decomposing the organic compounds to monomers by a depolymerization reaction or other reactions, and releasing the monomers. That is, decarbonizing which is treatment for reducing an amount of carbon remaining in the sintering sheet piece 125 is performed. Further, it is preferable to perform the calcining treatment under conditions which enable the amount of carbon remaining in the sintering sheet piece 125 to become 2000 ppm or less, preferably 1000 ppm or less. This makes it possible to densely sinter the entire sintering sheet piece 125 through subsequent sintering treatment to thereby suppress lowering of residual magnetic flux density and coercive force. In the case where a pressurization condition during the calcining treatment is set to a pressure greater than atmospheric temperature, it is desirable to set the pressure to 15 MPa or less. Further, the pressurization condition may be set to a pressure greater than atmospheric temperature, more specifically, to 0.2 MPa or more. In this case, an effect of reducing an amount of residual carbon can be particularly expected.

The binder decomposition temperature may be set based on a result of analysis of binder decomposition products and decomposition residues. Although the binder decomposition temperature may vary depending on the type of a binder, it may be set in the range of 200° C. to 900° C., preferably in the range of 400° C. to 600° C., e.g., to 450° C.

In the above calcining treatment, it is preferable to set a temperature rising speed to a smaller value, as compared to typical sintering treatment of a rare-earth magnet. Specifically, the temperature rising speed may be set to 2° C./min or less, e.g., 1.5° C./min. In this case, a good result can be obtained. Thus, the calcining treatment is performed such that a calcining temperature is increased at a given temperature rising speed of 2° C./min or less as depicted in FIG. 9, and, after reaching a predetermined setup temperature (binder decomposition temperature), held at the setup temperature for several hours to several ten hours. As above, the temperature rising speed in the calcining treatment is set to a relatively small value, so that carbon in the entire sintering sheet piece 125 is removed in a step-by-step manner without being rapidly removed. This makes it possible to reduce an amount of residual carbon to a sufficient level to thereby increase the density of a permanent magnet-forming sintered body after sintering. That is, by reducing the amount of residual carbon, it is possible to reduce voids in a permanent magnet. When the temperature rising speed is set to about 10° C./min as mentioned above, the density of a permanent magnet-forming sintered body after sintering can be increased to 98% or more (7.40 g/cm$^3$ or more), and high magnet properties can expected in a magnet after magnetization.

Subsequently, treatment for sintering the sintering sheet piece calcined by the calcining treatment, i.e., sintering treatment, is performed. In this example, as the sintering treatment, it is preferable to employ a uniaxial pressing-sintering method which comprises sintering the sintering workpiece while uniaxially pressing the sintering sheet piece 125 in the direction perpendicular to the sheet of the drawing of FIG. 10, although an in-vacuum non-pressurized sintering method may be employed. In this method, the sintering sheet piece 125 is loaded in a sintering die (not depicted) with a cavity having the same shape as that shown by "124" in FIG. 10. Then, after closing the die, the sintering sheet piece is sintered while being pressed in the direction perpendicular to the sheet of FIG. 10. Specifically, a uniaxial pressing sintering process is adopted, by having the sintering sheet piece 125 sintered while being pressed in a direction which is perpendicular to the rotation axis of the rotor 3 when the rare-earth permanent magnet produced from the sintering sheet piece 125 is inserted into the magnet receiving slot 31. As this pressing-sintering technique, it is possible to employ any heretofore-known techniques such as hot press sintering, hot isostatic press (HIP) sintering, ultrahigh pressure synthesis sintering, gas pressure sintering, and spark plasma sintering (SPS). In particular, it is preferable to employ the SPS in which a pressure can be applied in a uniaxial direction, and sintering is performed by electric current sintering. In the case where the sintering is conducted under a hot press sintering method, it is preferred that the pressure is adjusted in the range of for example 0.01 MPa to 100 MPa, the temperature being raised under an atmosphere of several Pa or lower to a temperature between 900° C. to 1000° C., for example to 940° C. at a temperature raising rate of 3° C./min. to 30° C./min. such as 10° C./min. and maintain at the temperature until the rate of change of the dimension in the direction of pressing in 10 seconds becomes 0. The time for maintaining the temperature is generally 5 minutes. Thereafter, the sintered sheet piece is cooled and heated again to a temperature in the range of 300° C. to 0.1000° C. and maintained under the temperature for 2 hours. With such a sintering process, it is possible to produce a sintered body for forming a rare-earth permanent magnet in accordance with one embodiment of the present invention As described, with the uniaxial sintering process wherein the sintering sheet piece 125 is sintered while being pressed in the direction perpendicular to the sheet of the drawing of FIG. 10, it is possible to avoid any possible risk of the orientation of the easy magnetization axes produced in the magnet material particles being changed during the sintering process.

The sintered body for forming a rare-earth permanent magnet is inserted into the magnet receiving slot 31 of the rotor 3 under a non-magnetized state. Thereafter, the sintered body for forming a rare-earth permanent magnet inserted into the slot 31 is magnetized along the easy magnetization axes, i.e., the C-axes of the magnet material particles contained in the sintered body. Specifically, a plurality of sintered bodies inserted into a plurality of slots 31 are subjected to a magnetization treatment so that N poles and S poles are alternately produced along the periphery of the rotor 3. Thus, it is possible to produce a rare-earth permanent magnet from the sintered body. In magnetizing the sintered body for forming a rare-earth permanent magnet, any of known devices such as magnetizing coils, magnetizing yokes, capacitor type magnetizing source may be used. Further, the sintered body may be magnetized prior to insertion into the slot 31, and the magnetized body may be inserted into the slot 31.

Subsequently, motor components such as a stator and a rotor shaft (not shown) may be assembled on the rotor to produce a desired electric motor such as an IPM motor.

As described, in producing a sintered body for forming a rare-earth permanent magnet, the magnet materials are pulverized into fine particles, and the pulverized particles of the magnet materials are mixed with a binder to form a compound 117. Then the compound 117 thus produced is formed into a sheet to provide a green sheet 119. Thereafter, the green sheet 119 thus produced is cut into a process sheet piece 123 which is then subjected to a parallel magnetic field which is directed in the thickness direction of the process sheet piece 123. Thus, the easy magnetization axes are oriented under the parallel magnetic field. The sheet which has been subjected to an orientation process is then formed into a desired configuration having a shape of a final product to produce sintering process sheet piece 125. The sheet piece 125 is then subjected to a sintering process without application of a pressure, or with a uniaxial pressing in the direction perpendicular to the sheet of the drawing of FIG. 10 to produce a sintered body for forming a rare-earth permanent magnet. By magnetizing the sintered body thus produced, a rare-earth permanent magnet 32 is produced. In the magnet 32 thus produced, the magnetization axes in the portion adjacent to the end region are oriented substantially along the slanted direction of the end surface, while in the portion adjacent to the central region, the magnetization axes oriented substantially along the parallel orientation. Further, in the intermediate portion, the slanted angle changes gradually from the slanted orientation in the end portions to the parallel orientation in the portion in the vicinity of the central region. As the results, it is possible to reduce the axial magnetic flux leakage to a remarkable extent.

EXAMPLES

Example 1

A rare-earth permanent magnet having the configuration shown in FIG. 3 has been produced.

<Coarse Pulverization>

An alloy having an alloy composition A (Nd; 23.00 wt. %; Pr; 6.75 wt. %; B; 1.00 wt. %; Ga; 0.10 wt. %; Nb; 0.2 wt. %; Co; 2.0 wt. %; Cu; 0.10 wt. %; Al; trace; Fe; balance; other unavoidable impurities) was prepared by a strip casting method and had hydrogen absorbed in a room temperature. The hydrogen absorbed alloy composition was held under an atmosphere of 0.85 MPa for one day. Then, the alloy was subjected to a hydrogen pulverization treatment by holding it under an atmosphere of 0.2 Pa while cooling it by liquefied argon.

<Fine Pulverization>

100 weight parts of the coarse particles of the alloy which was obtained through the hydrogen pulverization treatment was mixed with 1.5 Kg of Zr beads having diameter of 2 mm, and introduced into a ball mill having a tank of a capacity of 0.8 L (Atrita 0.8 L) obtainable from Nippon Cokes K.K. The ball mill was operated for 2 hours with a rotational speed of 500 rpm. Benzene was added in the amount of 10 wt. parts and liquefied argon was used as a solvent.

<Kneading>

A paste-like compound was prepared with the following process. The pulverized alloy particles were mixed with 1-octadecine and a 7 wt. % toluene solution of poly-isobutylene, with a ratio of 100 wt. part of alloy particles, 6.7 wt. part of 1-octadecine and 57 wt. part of toluene solution of poly-isobutylene. The mixture was brought into a mixer (Trade Name: TX-0.5 manufactured by Inoue Works) and agitated in the mixer under a reduced circumferential pressure at 70° C. to remove toluene. Then, the mixture was kneaded in the mixer for 2 hours.

<Orientation Under Magnetic Field>

Figure 12A:
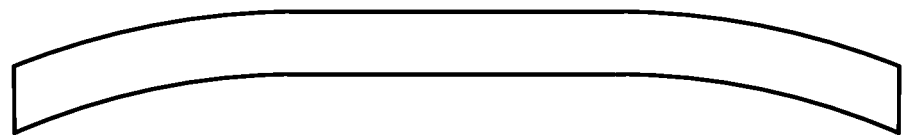
FIG. 12 (a) is a diagrammatical illustration showing a cavity configuration of a forming die used in the process of applying an external magnetic field in accordance with the example 1.
Figure 12B:
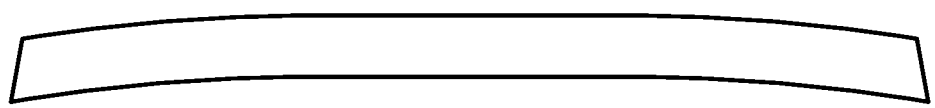
Figure 12C:

The compound prepared by the kneading process was brought into a corrosion resistant steel (SUS) die having a cavity of a shape similar to that shown in FIG. 12(*a*) to form a first shaped body (shaping process sheet) which was then subjected to an orientation process by applying an external parallel magnetic field using a super conductive solenoid coil (Trade Name: JMTD-12T100 manufactured by JASTEC Co.). The orientation process was carried out under a temperature of 80° C. for 10 minutes while applying an external parallel magnetic field of an intensity of 12T in a direction parallel to thickness direction of the trapezoidal shape of the cavity. The solenoid coil was then taken out while maintaining the temperature of the shaped body. Then, a de-magnetizing treatment was carried out after removing the solenoid coil by applying to the shaped body a reverse magnetic field. The application of the reverse magnetic field was carried out by changing the intensity from −0.2 T to +0.18 T and then to −0.16 T and the magnetic field was gradually decreased to an intensity of 0.

<Deforming Process>

Subsequent to the orientation process, the shaped body (shaping process sheet) of the compound was taken out of the die and brought into an intermediate shaping die of corrosion resistant steel (SUS) having an end arcuate shape shown in FIG. 10(*b*) which is shallower than that shown in FIG. 12(*a*). The shaping process sheet was then subjected to a deforming process by pressing the sheet in the intermediate shaping die under a temperature of 60° C. Further, the formed shaping process sheet was taken out of the intermediate shaping die and brought into a final shaping die of corrosion resistant steel (SUS) having a cavity shape shown in FIG. 10(*c*). A final shaping was conducted by pressing the shaping process sheet in the die under a temperature of 60° C. The shaped sheet was taken out of the final shaping die of corrosion resistant steel (SUS) and put into a graphite die having a cavity identical in shape to that shown in FIG. 12(*c*). The graphite die was of a widthwise dimension that is a dimension perpendicular to the sheet of the drawing of FIG. 12(*c*) which was larger than a corresponding dimension of the shaped trapezoidal compound by approximately 20 mm. The shaped compound was inserted into the cavity of the graphite die such that the compound is positioned in the central portion of the graphite die. The graphite die was in advance applied with powder of BN (boron nitride) as a remover.

<De-Oil Process>

A de-oiling process was applied to the compound in the graphite die under a suction pressure. A rotary pump was used for evacuation. The temperature was raised to 100° C. at a temperature increasing rate of 0.9° C./min. and maintained at 100° C. for 40 hours. With this process, any oil components such as lubricant for orientation and plasticizer.

<Calcining Process (De-Carbonize)>

A de-carbonizing process was applied to the formed shaping process sheet under a hydrogen atmosphere of 0.8 MPa. In this process, the temperature was raised from the room temperature to 400° C. at a raising rate of 6.3° C./min and the sheet was maintained under 400° C. for 2 hours. The hydrogen flow rate in this process was 2 to 3 L/min.

<Sintering>

Subsequent to the de-carbonizing process, a sintering process was carried out under pressure. For the purpose, a pressing die having a sectional configuration identical to the cavity configuration shown in FIG. 12(c) was inserted into the graphite die. The sintering process was carried out by applying a pressing force to the pressing die under a suction pressure. The pressing direction was perpendicular to the oriented direction of the easy magnetization axes of the magnet material particles, that is, the direction parallel to the widthwise direction of the compound sheet. During the sintering process, an initial load of 50 kgf was applied and the temperature was raised to 700° C. at a raising rate of 22.7° C./min. Thereafter, the temperature was raised to 950° C. at a raising rate of 8.3° C./min under a pressure of 50 kgf. The process sheet was maintained at the temperature of 950° C. for 5 minutes.

<Annealing>

The sintered body obtained by the sintering process was subjected to an annealing process by raising the temperature from the room temperature to 500° C. at a raising rate wherein the temperature is reached in 0.5 hour. The sintered body was held under the temperature for 1 hour and rapidly cooled to form a sintered body for forming a rare-earth magnet.

<Orientation Axes Angle Measurement>

The surface of the sintered body thus obtained was subjected to a surface treatment by a SiC paper polishing, buffing, and milling. Then the sintered body was measured for orientation axes angle using an SEM (Trade Name: JSM-7001F by Nippon Eletron) incorporated with EBSD detector (Trade Name: AZtecHLK EBSD Nordlys Nano Integrated by Oxford Instruments). Alternatively, for the measurement, it is possible to use a SEM (SUPRA40VP by Zeiss) incorporated with an EBSD detector manufactured by EDAX (Hikari High Speed EBSD Detector). The EBSD analysis was conducted with a viewing angle of 35 μm and a pitch of 0.2 μm. In order to improve analyzing precision, the analysis was conducted on a region having a size wherein at least 30 sintered particles are contained therein.

Figure 13:
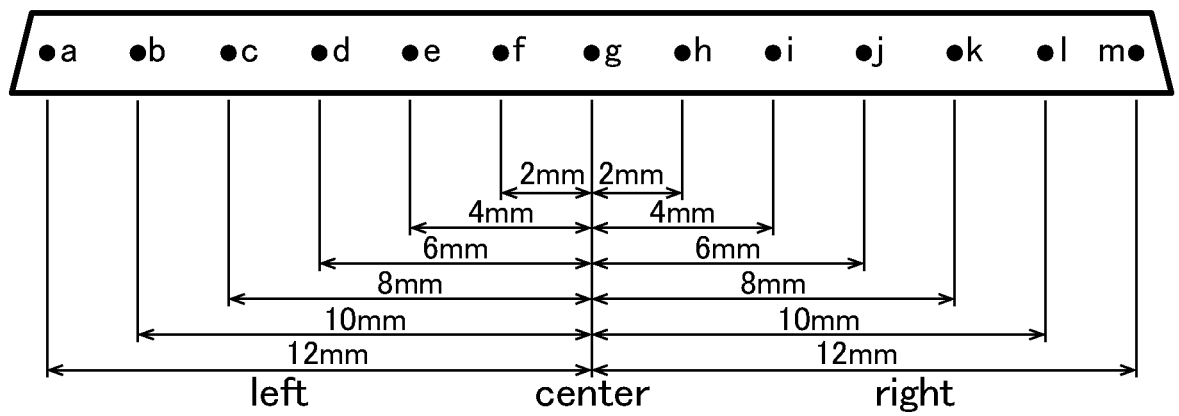
FIG. 13 shows diagrammatically locations where orientation angle measurements have been conducted in a sintered body obtained in accordance with the example 1.

In the Example 1, the sintered body of the trapezoidal shape was cut at the widthwise center portion and the lengthwise section was investigated. In FIG. 13, there are shown locations where the measurement conducted. The measurement was made along a longitudinal center line extending on the section along a center of the thickness of the section at 12 positions. The locations were position (a) at 12 mm left from the longitudinally center position, position (b) at 10 mm left from the longitudinally center position, position (c) at 8 mm left from the longitudinally center position, position (d) at 6 mm left from the longitudinally center position, position (e) at 4 mm left from the longitudinally center position, position (f) at 2 mm left from the longitudinally center position, the longitudinally center position (g), position (h) at 2 mm right from the longitudinally center position, position (i) at 4 mm right from the longitudinally center position, position (j) at 6 mm right from the longitudinally center position, position (k) at 8 mm right from the longitudinally center position, position (l) at 10 mm right from the longitudinally center position, and position (m) at 12 mm right from the longitudinally center position.

Figure 14:
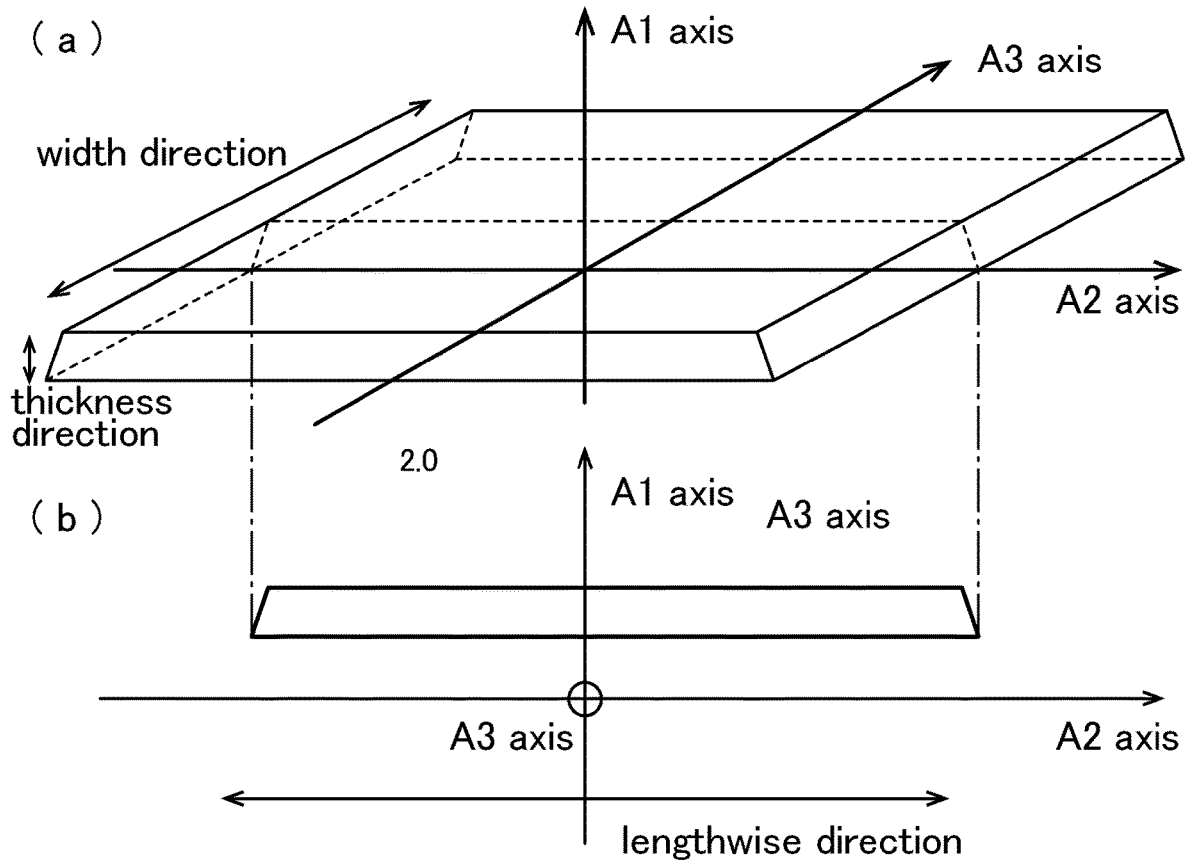
FIG. 14 shows axes of coordinates adopted for orientation angle measurements in a sintered body, wherein (a) is a perspective view and (b) is an end view.

The orientation axes angle direction was determined in each of the measuring positions as a direction in which the easy magnetization axes or the crystal C-axes (001) of the magnet material particles contained in the measuring area corresponding to the particular measuring position are oriented with the highest frequency. Referring to FIG. 14, there is defined rectangular coordinates comprising perpendicularly crossing A2 and A3 axes on the bottom surface of the sintered body and an A1 axis extending perpendicularly to the A2 and A3 axes, and the plane containing the A2 and A3 axes was chosen as the reference plane. The measurement of the orientation axis angle was made in terms of a deviation angle α which is an angle between the A1 and A3 axes, and a deviation angle θ+β which is an angle between the A1 and A2 axes.

It is to be noted that, in the present embodiment, the desired or predetermined direction of orientation shall be in the plane containing the A1 and A2 axes. Therefore, the angle α represents a deviation from the desired or predetermined direction of orientation. Thus, the angle α can be referred as a "deviation angle". The angle β used in connection with the angle β represents a design angle between the designed orientation angle of the easy magnetization axis and the A1 axis determined for any selected measurement position in the sintered body. Therefore, the angle β represents a deviation in the particular measurement position from the desired or predetermined direction of orientation. Thus, the β can be referred as a "deviation angle" in the particular measuring position. The results of the values in the Example 1 are shown in Table 1.

TABLE 1

| measurement | | orientation angle | | |
|---|---|---|---|---|
| | position | α (°) | θ + β (°) | θ (°) | β (°) |
| Example 1 | a | 0 | 27 | 30 | −3 |
| | b | 0 | 20 | 22.5 | −2.5 |
| | c | −5 | 19 | 15 | 4 |
| | d | −5 | 10 | 7.5 | 2.5 |
| | e | −5 | 0 | 0 | 0 |
| | f | −7 | 0 | 0 | 0 |
| | g | 0 | 0 | 0 | 0 |
| | h | −3 | 0 | 0 | 0 |
| | i | −3 | −3 | 0 | −3 |
| | j | 0 | −10 | −7.5 | −2.5 |
| | k | −3 | −15 | −15 | 0 |
| | l | −3 | −25 | −22.5 | −2.5 |
| | m | 0 | −30 | −30 | 0 |

It is to be noted that, in the central region (the measuring position e, f, g, h, i), the magnet material particles contained in the central region have easy magnetization axes extending substantially perpendicularly to one surface of the sintered body extending in a widthwise direction, and in one or both of the first and second end regions (the measuring positions a, b, c, d, j, k, l, m), the magnet material particles contained in the end region or regions have easy magnetization axes which converge toward the one surface such that the density of the magnet material particles oriented toward the one surface of the sintered body in the end region or regions is higher than that in the central region.

Figure 15:
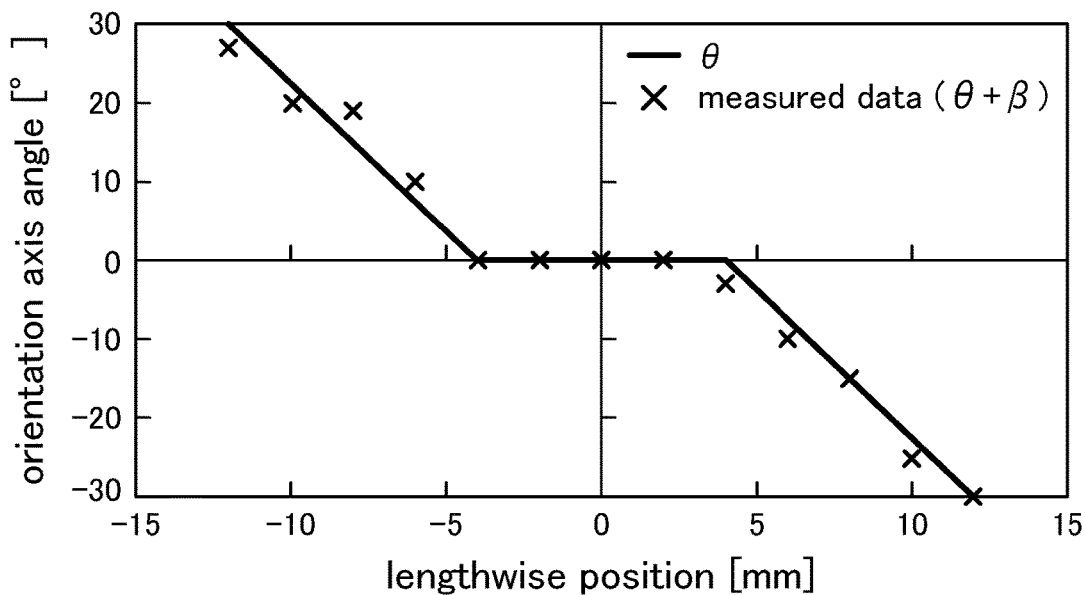
FIG. 15 is a graph showing deviations of the orientation angle in the example 1 from the design value.

It is further to be noted that the angle β which represents a deviation angle from the design value of the orientation angle θ is small and values of the orientation angle are close to design values in anyone of the measurement positions (refer to FIG. 15).

The slanted or inclination angles $\theta_1$ and $\theta_2$ are of a value 20°, and it was noted that the easy magnetization axes were slanted or inclined with respect to the first surface at positions adjacent to the end surfaces and directed substantially along the end surfaces.

It should further be noted that by polishing the end surfaces of the sintered body for forming a rare-earth permanent magnet, it is possible to make the slanted or inclination angles of the easy magnetization axes substantially the same as those of the end surfaces.

LIST OF REFERENCE SIGNS

1: rotary electric machine
2: stator
2a: end surface
3: rotor
3a: end surface
9: central region
31: magnet receiving slot
32: permanent magnet
32a,32b: magnet end surface
32c: first surface
32d: second surface
117: compound
119: green sheet
120: slot-die
123: process sheet piece
125: sintering process sheet piece
C: easy magnetization axis
θ: slanted angle

The invention claimed is:

1. A rotary electric machine comprising an annular stator and a rotor arranged on a rotational shaft arranged rotationally about a rotational axis in the stator to extend longitudinally through the stator with an air gap between the stator and the rotor, the rotor having at least one rare earth permanent magnet arranged with a lengthwise direction parallel with the rotational axis, said rare-earth magnet including a first surface extending in said lengthwise direction, a second surface distant in a widthwise direction from the first surface and extending in the lengthwise direction, and end surfaces located in the opposite end portions as seen in the lengthwise direction, at least one of the end surfaces being projected beyond a corresponding end surface of the stator toward a lengthwise outward direction;
wherein:
said rare-earth permanent magnet comprises magnet material particles containing rare-earth materials sintered and formed into a shape having at least one of the end surfaces is formed into a first slanted surface which is slanted and extends from the lengthwise end portion of the first surface toward the lengthwise outward direction so that the magnet has a predetermined three dimensional shape having a length of the first surface shorter than the second surface;
said rare-earth permanent magnet includes divided regions at least including a lengthwise central region, and a first end region which extends from the at least one end surface to a portion apart from the end surface for a predetermined lengthwise distance;
in the central region, the magnet material particles in the central region are such that magnetization axes of the magnet material particles included in the central region are oriented in a parallel orientation wherein the magnetization axes of the magnet material particles are oriented substantially perpendicularly to the first surface which extends in the lengthwise direction;
said magnet material particles in the first end region are oriented in a portion adjacent to the at least one end surface toward the first surface in such a manner that the magnetization axes of the magnet material particles are oriented substantially along a slanted angle of the first slanted surface, but in a portion adjacent to the central region, the magnet material particles are oriented such that the magnetization axes of the magnet material particles are oriented substantially perpendicularly to the first surface, and in a portion between the at least one end surface and the central region, the magnetization axes of the magnet material particles are oriented such that an orientation angle of the magnetization axes of the magnet material particles are gradually changed from the end surface to the central region and converged toward the first surface.

2. The rotary electric machine in accordance with claim 1; wherein said rare-earth permanent magnet is of a structure wherein the other of the end surfaces is projected beyond a corresponding end surface of the stator toward a lengthwise outward direction, in such a case, the other end surface is formed into a second slanted surface which is slanted and extends from a lengthwise end portion of the first surface toward the lengthwise outward direction so that the magnet has the predetermined three dimensional shape having the length of the first surface shorter than the second surface; said rare-earth permanent magnet including a second end region which extends from the other of the end surfaces to a portion apart from the other end surface for the predetermined lengthwise distance, and the magnet material particles in the second end region in a portion adjacent to the other end surface are oriented toward the first surface in such a manner that the magnetization axes of the magnet material particles are oriented substantially along the slanted angle of the first slanted surface, but in a portion between the other end surface and the central region, the magnetization axes of the magnet material particles are oriented such that the orientation angle of the magnetization axes of the magnet material particles are gradually changed from the end surface to the central region and converged toward the first surface.

3. The rotary electric machine in accordance with claim 1; wherein said slanted angle $\theta_1$ of the first slanted surface with respect to a line perpendicular to the first surface is in a range between 5° and 45°.

4. The rotary electric machine in accordance with claim 2; wherein said slanted angle $\theta_2$ of the second slanted surface with respect to a line perpendicular to the first surface is in a range between 5" and 45°.

5. The rotary electric machine in accordance with claim 1; wherein said slanted angle $\theta_1$ of the first slanted surface with respect to a line perpendicular to the first surface is in a range between 5° and 15°.

6. The rotary electric machine in accordance with claim 2; wherein said slanted angle $\theta_2$ of the second slanted surface with respect to a line perpendicular to the first surface is in a range between 5° and 15°.

7. The rotary electric machine according to claim 1; wherein said first end region is arranged such that it extends lengthwise outward direction beyond a corresponding lengthwise end surface of the rotor.

8. The rotary electric machine according to claim 2; wherein said second end region is arranged such that it extends lengthwise outward direction beyond a corresponding lengthwise end surface of the stator.

9. The rotary electric machine according to claim 1; wherein said first end region is defined to satisfy a relation $0.1 \leq a/L \leq 0.6$, where 2 L is a lengthwise dimension of the second surface and is a lengthwise dimension of the first end region along the second surface.

10. The rotary electric machine according to claim 2; wherein said second end region is defined such that a relation $0.1 \leq a/L \leq 0.6$ is met, where 2 L is a lengthwise dimension of the second surface and is a lengthwise dimension of the second end region.

11. A sintered body for forming a rare-earth permanent magnet having a surface extending in a lengthwise direction and adapted to be assembled in a rotary electric machine with the surface arranged in parallel with a rotational axis of the rotor of the rotary electric machine;
wherein;
said sintered body for forming a rare-earth permanent magnet includes magnet material particles containing rare-earth materials, sintered into a three dimensional body having a first surface extending in a lengthwise direction, a second surface distant in a widthwise direction from the first surface and extending in the lengthwise direction, and end surfaces located in the opposite end portions;
among the opposite end surfaces, at least one of the end surfaces is formed into a first slanted surface which is slanted and extends from a lengthwise end portion of the first surface toward the lengthwise outward direction so that the magnet has a predetermined three dimensional shape having a length of the first surface shorter than the second surface;
said sintered body for forming the rare-earth permanent magnet includes divided regions at least including a lengthwise central region, and a first end region which extends from the at least one end surface to a portion apart from the end surface for a predetermined lengthwise distance;
in the central region, magnet material particles in the central region are such that easy magnetization axes of the magnet material particles included in the central region are oriented in a parallel wherein the easy magnetization axes of the magnet material particles are oriented substantially perpendicularly to the first surface which extends in the lengthwise direction;
said magnet material particles in the first end region are oriented at least in a portion adjacent to the at least one end surface are oriented toward the first surface in such a manner that the easy magnetization axes of the magnet material particles are oriented substantially along a slanted angle of the first slanted surface, but in a portion adjacent to the central region, the magnet material particles are oriented such that the easy magnetization axes of the magnet material particles are oriented substantially perpendicularly to the first surface, and in a portion between the at least one end surface and the central region, the easy magnetization axes of the magnet material particles are oriented such that an orientation angle of the easy magnetization axes of the magnet material particles are gradually changed from the end surface to the central region and converged toward the first surface.

12. The sintered sintered body for forming a rare-earth permanent magnet in accordance with claim 11; wherein the other end surface among the opposite lengthwise end surfaces is formed into a second slanted surface which is slanted and extends from a lengthwise end portion of the first surface toward the lengthwise outward direction so that the sintered body has the predetermined three dimensional shape having the length of the first surface shorter than the second surface; said sintered body further including a second end region which extends from the other of the end surfaces to a portion a part from the other end surface for a predetermined lengthwise distance, the magnet material particles in the second end region in a portion adjacent to the other end surface toward the first surface are oriented in such a manner that the easy magnetization axes of the magnet material particles are oriented substantially along the slanted angle of the first slanted surface, and in a portion between the other end surface and the central region, the easy magnetization axes of the magnet material particles are oriented such that the orientation angle of the easy magnetization axes of the magnet material particles are gradually changed from the end surface to the central region and converged toward the first surface.

13. The sintered body for forming the rare-earth permanent magnet in accordance with claim 11; wherein the slanted angle $\theta_1$ of the first slanted surface with respect to the first surface is in a range between 5° and 45°.

14. The sintered body for forming a rare-earth permanent magnet in accordance with claim 12; wherein the slanted angle $\theta_2$ of the second slanted surface with respect to the first surface is in the range between 5° and 45°.

15. The sintered body for forming a rare-earth permanent magnet in accordance with claim 11; wherein said slanted angle $\theta_1$ of the first slanted surface with respect to the first surface is in a range between 5° and 15°.

16. The sintered body for forming a rare-earth permanent magnet in accordance with claim 12; wherein the slanted angle $\theta_2$ of the second slanted surface with respect to the first surface is in the range between 5° and 15°.

17. The sintered body for forming a rare-earth permanent magnet according to claim 11; wherein the first end region is defined to satisfy a relation $0.1 \leq a/L \leq 0.6$, where 2 L is a lengthwise dimension of the second surface and is a lengthwise dimension of the first end region along the second surface.

18. The sintered body for forming a rare-earth permanent magnet according to claim 12; wherein the second end region is defined to satisfy a relation $0.1 \leq a/L \leq 0.6$, where 2 L is a lengthwise dimension of the second surface and is a lengthwise dimension of the first end region along the second surface.

* * * * *